US012397277B2

(12) United States Patent
Serra Alfaro et al.

(10) Patent No.: US 12,397,277 B2
(45) Date of Patent: Aug. 26, 2025

(54) METHOD FOR DIRECTLY REDUCING A MATERIAL BY MEANS OF MICROWAVE RADIATION

(71) Applicants: UNIVERSITAT POLITÈCNICA DE VALÈNCIA, Valencia (ES); CONSEJO SUPERIOR DE INVESTIGACIONES CIENTIFICAS (CSIC), Madrid (ES)

(72) Inventors: José Manuel Serra Alfaro, Valencia (ES); José Manuel Catala Civera, Valencia (ES); Beatriz García Baños, Valencia (ES); Juan Francisco Borrás Morell, Valencia (ES); Laura Navarrete Algaba, Valencia (ES)

(73) Assignees: Universitat Politècnica de València, Valencia (ES); Consejo Superior de Investigaciones Científicas, Madrid (ES)

( * ) Notice: Subject to any disclaimer, the term of this patent is extended or adjusted under 35 U.S.C. 154(b) by 975 days.

(21) Appl. No.: 17/458,213

(22) Filed: Aug. 26, 2021

(65) Prior Publication Data

US 2022/0016595 A1    Jan. 20, 2022

Related U.S. Application Data

(63) Continuation of application No. PCT/ES2020/070146, filed on Feb. 28, 2020.

(30) Foreign Application Priority Data

Feb. 28, 2019 (ES) ............................. ES201930189

(51) Int. Cl.
*B01J 19/12* (2006.01)
*C01B 3/06* (2006.01)
*C01B 32/40* (2017.01)
*H05B 6/80* (2006.01)

(52) U.S. Cl.
CPC ............ *B01J 19/126* (2013.01); *C01B 3/061* (2013.01); *C01B 32/40* (2017.08); *H05B 6/806* (2013.01); *B01J 2219/1206* (2013.01)

(58) Field of Classification Search
CPC ......... B01J 19/126; C01B 3/061; C01B 32/40
See application file for complete search history.

(56) References Cited

U.S. PATENT DOCUMENTS

| 5,507,927 A | 4/1996 | Emery |
| 6,437,303 B1 * | 8/2002 | Dorr ................... H05B 6/80 |
| | | 219/679 |
| 2004/0100280 A1 | 5/2004 | Ju et al. |

FOREIGN PATENT DOCUMENTS

| CN | 109022760 A | 12/2018 |
| DE | 4226496 A1 | 1/1993 |
| EP | 2023068 A1 | 2/2009 |
| JP | 2009199855 A | 9/2009 |
| JP | 2017204438 A | 11/2017 |
| JP | 2018142461 A | 9/2018 |

OTHER PUBLICATIONS

Catala Civera et al.; "Dynamic Measurement of Dielectric Properties of Materials at High Temperature During Microwave Heating in a Dual Mode Cylindrical Cavity"; IEEE Transactions on Microwave Theory and Techniques, vol. 63, No. 9, Sep. 2015—(11) pages.
Xin Wang et al.; "Thermodynamics and kinetics of carbothermal reducation of zinc ferrite by microwave heating"; ScienceDirect; www.sciencedirect.com; Trans. Nonferrous Met. Soc China 23(2013) 3808-3815—(8) pages.
International Search Report dated Jun. 8, 2020; Application No. PCT/ES2020/070146—(3) pages.
Japaneses Patent Office Action for Application No. 2021-549952 dated Mar. 26, 2024 (6 pages, including an English Summary).
Extended European Search Report dated Dec. 23, 2022; Application No. 20763309.0-1101 / 3932538 PCT/ES2020070146—(1) page.
Saudi Arabia First Examination dated Dec. 29, 2022—(11) pages.
Written Opinion Application No. 20763309.0—(4) pages.
Translation of Final Rejection in Japanese Application No. 2021-549952, dated Sep. 3, 2024 (2 pages).
Official Action Summary from United Arab Emirates Application No. P6001511/2021, dated Feb. 15, 2024 (8 pages).

* cited by examiner

*Primary Examiner* — Stuart L Hendrickson
(74) *Attorney, Agent, or Firm* — Boyle Fredrickson, S.C.

(57) ABSTRACT

The present invention relates to the reduction of materials at low temperatures (<600° C.) by means of microwave radiation without needing to use chemical reducing agents or electrical contacts. It relates more specifically to a method for reducing a material, which comprises the following steps:
  applying microwave radiation to a material disposed in a microwave application cavity; and
  separating simultaneously the fluid oxidation products generated from the reduced material,
such that the method is carried out without chemical reducing agents or electrical contacts.

15 Claims, 14 Drawing Sheets

METHOD FOR DIRECTLY REDUCING A MATERIAL BY MEANS OF MICROWAVE RADIATION

FIELD OF THE INVENTION

Figure 1:
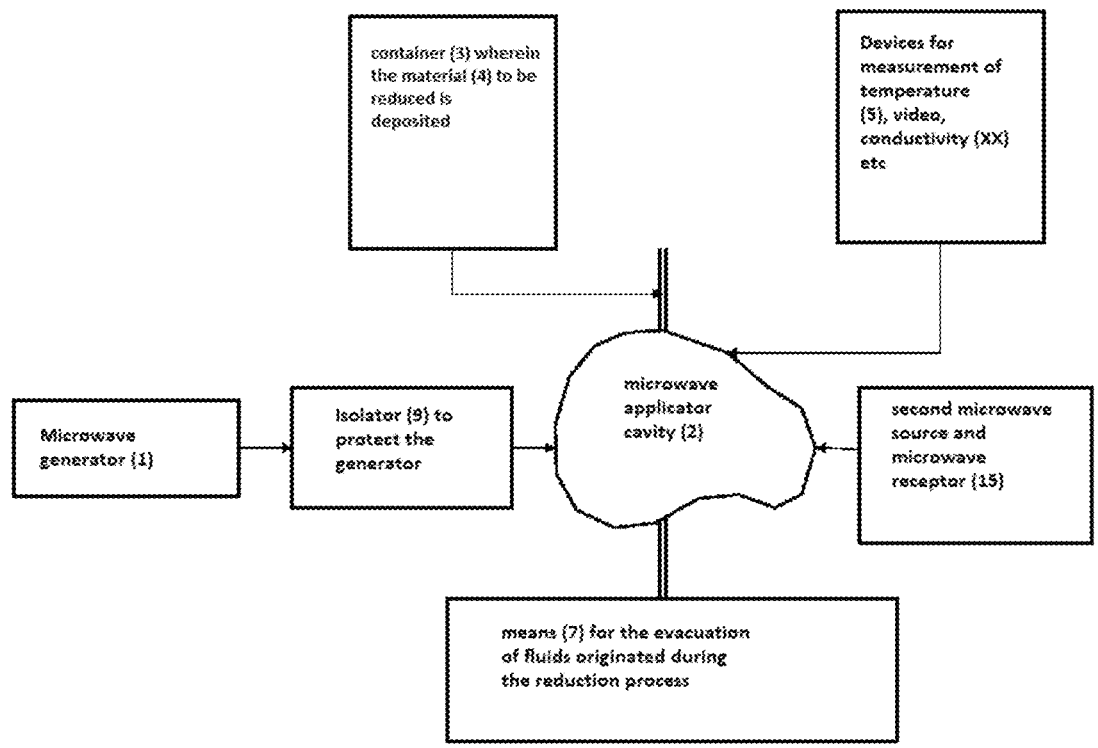

This application is a continuation of and claims priority to PCT Application No. PCT/ES2020/070146, filed Feb. 28, 2020, which, in turn, claims priority to Spanish Application No. ES201930189, filed Feb. 28, 2019, the entire contents of each application is incorporated herein by reference.

FIELD OF THE INVENTION

The present invention belongs to the field of the use of electromagnetic radiations, more specifically microwave radiations, used in the reduction of materials without the need to use reducing chemical agents and the combined production of chemical products.

BACKGROUND OF THE INVENTION

The future of sustainability depends on a complete renewable energy system, driven by the availability of currently inexpensive energy. The volatile nature of renewable energy requires new efficient ways to store and convert energy, as well as the rational use of electricity.

The transformation of energy systems from fossil to renewable sources with the aim of improving sustainability and mitigating the $CO_2$ footprint is one of the main challenges facing both the power and process industry sectors.

Due to the volatile and intermittent nature of electricity from renewable energy sources, a way to store energy in production peaks is required, so that it will be used in production valleys, thus maintaining efficient grid stability in based on demand fluctuations. Likewise, the process industry requires new, more efficient methods that allow the performance of different unit processes, for example, chemical conversion or molecular separation units, through the direct use of (renewable) electricity instead of mainly processes based on the combustion or oxidation of hydrocarbons from fossil or renewable sources.

Energy conversion and storage (ECS) is a key concept based on the absorption of excess renewable energy to generate chemical energy carriers in the form of fuel (hydrogen, methane or other) or chemicals. Current methods for ECS are electrochemical cells that function as electrolyzers (for example, PEM EC, proton-exchange membrane electrolyzer cell or SOEC—solid oxide electrolyzer cell —, which produce fuel and electricity feedstocks) or as solid electrolytic fuel cells (SOFC, which produces electricity from fuel), solid electrolyte oxygen separator (SEOS) or thermal methods (concentrated solar energy, CSP or waste heat) to obtain the chemical energy carriers. This Power to X (PtX) transformation could be extended further for the production, not only of $O_2$, $H_2$ or hydrocarbons, but also advanced alkaline fuel cells, synthesis of ammonia or nitrides as energy storage material.

However, the thermal and/or electrical energy required in these processes is very high.

In some cases, these transformations, such as the reduction of materials, can be carried out at high temperatures and/or using contact electrodes, which adds a lot of complexity to the installation, resulting in a very high investment (CAPEX), a difficult control and very difficult the process operability, in addition to very high operating costs (OPEX) and low energy and mass efficiencies.

Microwave processing has shown clear advantages over conventional heating in many scientific and technological fields. This technology has become an effective and efficient method for processing a variety of materials such as ceramics, composites, metals, catalysts and other reaction systems [Zhou et al., 2016] Ultrafast microwave interaction with materials, and in particular microwave interaction at high temperatures, can create new reaction pathways and processes that are not possible using other irradiation methods.

In the document Catala-Civera et al., Dynamic Measurement of Dielectric Properties of Materials at High Temperature During Microwave Heating in a Dual Mode Cylindrical Cavity. IEEE Trans. Microw. Theory Tech. 2015, 63, 2905-2914, a microwave cavity and heating system for microwave processing and in-situ dynamic measurements of is described. However, the equipment described in this article presents essential differences with the equipment described in the present invention, for example, among others, the fact that it does not have the capacity to evacuate substances.

U.S. Pat. No. 5,507,927 discloses a process for reducing organic materials so that depolymerization occurs, but does not become pyrolyzed and so that the reduction takes place in a reducing atmosphere.

The present invention solves these problems of the state of the art. With the microwave assisted process of the present invention, it has been possible to reduce materials that otherwise would not have been possible. In addition, the reduction of materials is carried out by means of new equipment that achieves the electrochemical activation of materials for the chemical reaction and the production of chemical products, such as $O_2$ and CO, and energy carriers, such as $H_2$, the reduced anode of a battery. The interaction of microwaves with the inherent nature of the materials is used to produce a reduction of said materials at temperatures never observed for this type of materials, even in some cases, below 300° C.

DESCRIPTION OF THE INVENTION

The present invention relates to the direct reduction of materials at low temperatures (<600° C.) by means of microwave radiation without the need to use chemical reducing agents or electrical contacts.

The term "microwave" refers to non-ionizing electromagnetic radiation that occupies in the electromagnetic spectrum a frequency band between infrared and radio frequencies.

The expression "reducing a material" is understood as the decrease in the oxidation state of at least part of the cations constituting the material. The material directly absorbs microwave radiation without the need for the presence of other additives for absorption and electronic transfer, such as organic molecules, polymers, metals or metallic alloys.

The expression "shot temperature" is understood as the temperature at which an abrupt change in the electrical conductivity of the material is identified due to the activation of charge carriers in it, resulting in the reduction of the material processed with microwaves.

The present invention refers to a process for the reduction of a material, which comprises performing the following operations:
  applying microwave radiation to a material disposed in a microwave applicator cavity,
  heating to at least exceeding a shot temperature in the material
  separating the fluid oxidation products generated from the reduced material and such that the process is carried out without reducing chemical agents.

The process of the invention is carried out without electrical contacts.

In the process of the invention, the operations mentioned in the previous definition, and according to claim 1, do not have to be carried out in the order indicated. That is, it is not a chronological order, they can be done in the order mentioned or in another order.

According to preferred embodiments, the process is carried out in a container that has the ability to evacuate fluids.

The increase in temperature by itself produces an increase in conductivity. At the shot temperature there is an abrupt change in conductivity, much more important than the mere effect of the increase in conductivity due to the increase in temperature. This is due to the sudden increase in the conduction of electronic carriers caused by microwave radiation.

The application of microwave radiation is maintained until a temperature increase of between 50-250° C. is achieved, and preferably between 50 and 100° C., above the shot temperature.

"Suddenly" or "abruptly" means in this context that the conductivity increases by at least 4% in a temperature increase of 4 degrees Celsius.

In the process of the invention, the electrical conductivity of the material is increased by at least 50% with respect to the conductivity of the unreduced material, by increasing the temperature by 4° C.

In the reduction of the material, a product is released as a result of the oxidation of the anion associated with the cation, which is reduced. The oxidation product is often an unstable product. However, this oxidized product can be useful "in situ".

According to particular embodiments, the oxidation product evacuated is $O_2$, $O_3$, $Cl_2$, $F_2$, $Br_2$, $CO_2$, $SO_3$ or mixtures thereof. When solid oxides are reduced, for example, $O_2$ is released, in the case of chlorides, $Cl_2$ is released, in the case of sulfides, S is released, etc.

If said oxidation product is not evacuated from the container in which the material is contained, inside the cavity, when the microwave radiation ceases, it generally reacts again with the material and re-oxidizes it, returning it to its original state.

The materials that can be reduced by the process of the invention can be in the solid state, in the molten state, suspended or dissolved in a fluid. Said fluid may be, for example, water (for example, water in a liquid or supercritical state) or a hydrocarbon capable of being in a liquid state under the conditions of the process (for example, paraffins, waxes, oils).

For the phenomenon of reduction through absorption of microwave radiation to occur under conditions of practical industrial use (for example, below 600° C.), the material to be reduced must meet certain characteristics:

The material must have, in crystalline or amorphous form, cations capable of being reduced. Material reduction takes place through the reduction of specific metal cations of elements selected from Ti, Fe, Co, Zr, Cr, Nb, Ta, W, Mo, rare earths and U (for example: $Ce^{+4}$, $Ti^{+4}$, $Zr^{+4}$, $W^{+6}$, $Pr^{+4}$, $Nd^{+3}$, $Nb^{+5}$) which consequently leads to the oxidation of its counter-anion to form a product that can be evacuated.

In solids, for a homogeneous reduction of the solid (inside and outside of the grains) it is advantageous to have a certain degree of ionic conductivity (for the specific anion that is oxidized), so that the anion can diffuse through the grain of the solid towards the outside to be released after its oxidation.

In the case of extended solids (nanoparticulate or with high surface area), the ionic conduction property is not advantageous since the solid state ion conduction step is not necessary at the microscopic level within each grain of material.

According to further particular embodiments, the simultaneous separation of the fluid oxidation products, generated from the reduced material, is carried out by one of the following means or combinations thereof:
the application of vacuum,
the use of an entrainment fluid,
use of a reactive fluid that consumes it or
use of a selective separator of the generated oxidation product.

The process of the invention may further comprise a step of in-situ measurement of the conductivity of the material to be reduced by applying microwave radiation from a second source and an associated receiver without mutual inferences. This step or operation of in-situ measurement of the conductivity of the material to be reduced can be carried out during the whole procedure, it does not have to be a previous step.

The first microwave source is responsible for heating the sample and ensuring that the shot temperature is exceeded and applying the threshold potential to generate the reduction of the material. The second source is the one responsible for generating the microwave signals necessary for the conductivity measurement, and is therefore necessary for advanced process control. This allows the monitoring and detection of the shot temperature, as well as knowing the moment in which a change in conductivity occurs and therefore, the reduction of the material.

In-situ measurement of the shot temperature of the material can be carried out through conductivity measurements of the material to be reduced and the temperature of the material.

The process of the invention also considers, according to particular embodiments, in-situ and continuous measurement of the shot temperature of the material through conductivity and material temperature measurements.

Above the "shot temperature" the reduction process occurs by applying microwave radiation in a device that allows control of the homogeneity in the radiation on the material and control of the applied power, thus preventing heterogeneities and possible deterioration of the material.

During the reduction process, a continuous adjustment of the microwave power applied for irradiation can be carried out, in order to optimize the power transfer due to the fact that the electrical conductivity of the material changes with temperature. Continuous adjustment of the applied power implies an improvement in the amount of material reduced.

Control of irradiation and microwave power is essential in the process.

The process of the invention further comprises, according to particular embodiments, performing a continuous adjustment of the power applied for irradiation while applying the radiation.

The process of the invention comprises, according to further particular embodiments, the following steps:
to place the material in a container capable of evacuating fluids, and inert to MW radiation,
to insert the container through an orifice located in a wall of the applicator cavity in an area of uniform and intense electric field (preferably, as intense as possible) for uniform and efficient heating
to identify the "shot temperature" for that material, to apply microwave radiation until the material is reduced, to heat up to at least exceeding the shot temperature in the material, while applying the radiation, carry out a continuous adjustment of the applied power for the irradiation and to separate the fluid oxidation products generated from the reduced material and such that the process is carried out without reducing chemical agents.

The present invention also relates to an equipment (FIG. 1) to carry out the procedure defined above, which comprises:

at least one microwave radiation source (1), a microwave applicator cavity (2), and a container (3) in which the material (4) which is to be reduced, is deposited.

The equipment may further comprise:

at least one temperature sensor (5) to measure the temperature of the material during microwave application (6)

at least one means for the evacuation of fluids (7) originated during the reduction process.

The microwave radiation source (1) for irradiation can be a magnetron-based microwave generator or a microwave generator based on a solid state amplifier.

The microwave radiation source (1) can operate at frequencies between 300 MHz and 300 GHz. For example, according to particular embodiments, the microwave radiation source (1) operates at the frequencies 915 MHz, 2450 MHz or 5800 MHz, frequencies intended for industrial, scientific or medical applications that do not require a private license (called ISM frequencies "Industrial Scientific and Medical).

The equipment may comprise a power isolator (9) to protect the source of microwave radiation against reflected power from the applicator cavity (2).

The applicator cavity (2) can be a microwave resonator, if the intensity of microwave radiation required is high. Furthermore, the microwave resonator can have a cylindrical, polyhedral (prismatic, for example) or spherical shape.

The microwave radiation (6) is introduced into the applicator cavity (2) through a waveguide, or through a coupling or opening (10) in one of its side or top/bottom walls.

According to particular applications, the coupling (10) to introduce the microwave radiation into the applicator cavity is based on an electrical probe, a magnetic probe (current loop) or an opening in one of the walls (side, top and bottom).

The applicator cavity (2) can have at least one non-radiating orifice located on the upper wall and a second non-radiating orifice located on the bottom wall (11), which allow the passage of substances, in particular, the introduction and evacuation of gases (7).

The container (3) which is arranged inside the cavity must be made of an inert material, that is, one which does not absorb microwaves, which does not react with the material to be reduced and which withstands the maximum temperatures of the electrochemical process. Said container can be, for example, a quartz or alumina tube, materials inert to microwaves and capable of withstanding high temperatures (>600° C.). Furthermore, the container (3) must allow it to work in contact with different chemical products, generally in the form of gases.

According to a particular embodiment, the container (3) comprises a porous medium that acts as a mechanical support (12) on which a material (4) is held in a solid state to be irradiated. Examples of supports: porous ceramic membranes (frits), ceramic foams, fiber meshes or felts, or microperforated plates.

The applicator cavity (2) may comprise an access orifice (13) in the side wall that allows to measure the temperature of the surface of the material or of the container containing material located inside. It can be measured, for example, through an infrared thermometer (5) placed outside the cavity.

According to further particular embodiments, the applicator cavity (2) comprises an additional coupling (14) of a second source of low-power microwave radiation (15) and associated receiver for the purpose of performing in-situ and simultaneous conductivity measurements. Said second source is protected from interference with the first radiation source.

Also optionally, the cavity can have additional orifices (16) to provide recording media, such as video cameras for observation of the material during the reduction process.

Said orifices, and in general, the orifices in the cavity have dimensions, and are positioned, to ensure that they do not disturb the fields and resonances of both resonant modes, and to avoid microwave leakage.

Also optionally, the cavity can have means for the analysis (8) of the composition of the products released in the reduction process, and that facilitate the control and operability of the entire process.

The equipment can also comprise a mass spectrometer (8) for the analysis of the gases produced during microwave radiation. The equipment can further comprise means for evacuating fluids (7) originated during the reduction process, such as means for applying vacuum, or means for entraining fluids, or means for circulating reactive fluids that consume the fluid generated during the reduction.

The equipment may further comprise a water cooling system (17).

According to a particular embodiment of the equipment for microwave material reduction according to the process of the invention, the equipment (FIG. 5) comprises a microwave applicator cavity (2), a microwave generator (1), an insulator to protect the microwave generator (9), a container (3) to introduce the material to be reduced (4), a sensor to measure the temperature (5) of the container (3) and material (4) from outside the cavity (2) and a system (not included in FIG. 5) for the evacuation of the fluids (7) originated during the reduction process.

The microwave applicator cavity (2), according to a particular embodiment, is designed as a cylindrical shaped microwave resonator in order to be able to irradiate materials with low and high dielectric losses from the material itself with the same cavity.

The electromagnetic field configuration for microwave irradiation exhibits a uniform and intense electric field in the center of the resonator cavity, where the sample (4) is placed, as corresponds to a configuration of the TE111 electrical transverse resonant mode.

The TE111 cylindrical irradiation mode is selected to have a resonance around the ISM frequency of 2.45 GHz, which facilitates its application or subsequent industrial implementation. The cavity dimensions are carefully designed to avoid interference from other resonant modes. These cavity dimensions can be modified to have the equivalent TE111 resonant mode around additional ISM frequencies, also available for industrial use (e.g. 0.915 GHz, 5.8 GHz, etc.).

The microwave power signal (microwave radiation) to irradiate the material is introduced into the resonant cavity (2) (applicator cavity) through an electrical probe placed on the side wall through a coupling (10) with a N-connector (internal diameter ~3 mm).

The microwave irradiation source (1) can be a solid state amplifier driven by the RF output of a vector network analyzer or a microwave generator (1) based on a magnetron.

At the outlet of the microwave source (1) a power isolator (9) is normally placed to protect the source against reflected power from the cavity.

In this particular embodiment, the sample volume of material (4) to be reduced is set at 10 mm in diameter and 15 mm in height, according to the electric field in the cavity.

The material is placed inside a container (3), on a porous membrane to hold the sample (FIGS. 1 and 5), while allowing the flow of gases due to its porosity.

The container (3) for the sample is a quartz tube (internal diameter ~10 mm, external diameter ~12 mm), capable of withstanding high temperatures (~1300° C.). The container (3) is introduced into the microwave applicator cavity (2) through one or more non-radiating orifices (11) located on the top and bottom walls until the material is located in the center of the cavity, in the position of maximum intensity of the electric field, to ensure uniform sample processing. Furthermore, this allows for intense and very efficient irradiation cycles.

These orifices (11) allow the introduction and evacuation of gases through the container.

In this particular embodiment, the inlet tube to the container (3) would be connected to a gas supply conduit and the outlet (11) would be connected to an inlet conduit to a gas analyzer (8), such as a mass spectrometer (8). Once the inlet gas flows through the material in a steady state, microwave radiation is applied and the material (4) is reduced, which is fixed in a supported bed (12), so that an oxidizing gas is released. Said gas is entrained by a carrier gas and is extracted through a fluid evacuator (7), and finally analyzed by means of a mass spectrometer (8).

To avoid thermal expansion of the cavity during operation, the temperature of the cavity resonator can be optionally controlled by a water cooling system (17).

Automatic operation of the microwave radiation process is accomplished by connecting the analyzer to a computer with a GP-IB link.

An infrared thermometer (5) is used to measure the surface temperature of the sample (4) to be reduced from outside the cavity through a shear orifice (13) of 7 mm in diameter located in the side wall of the cavity. Another 7 mm orifice (16) is used to place a video camera to observe the sample to be reduced during microwave radiation. The dimensions and positions of the access holes in the cavity were designed to ensure that they do not disturb the fields or resonances in both modes, and to avoid microwave leakage.

For a correct and continuous determination of the temperature of the microwave irradiated material through the measurement of the surface temperature of the material with a temperature sensor (5), namely an infrared pyrometer, a calibration procedure based on the introduction of temperature-controlled reference samples and the temperature measured from the surface has been adjusted.

The microwave driven reduction mechanism requires specific irradiation conditions. For reduction to take place the "shot temperature" must be reached and above this temperature the reduction process always takes place when microwave radiation is applied in a properly manner. Properly means without damaging the material by excessive application of power.

This shot temperature in the material is identified by an abrupt change in electrical conductivity. The change in electrical conductivity is also manifested by a sharp increase in microwave absorption and temperature of the material.

Figure 5:
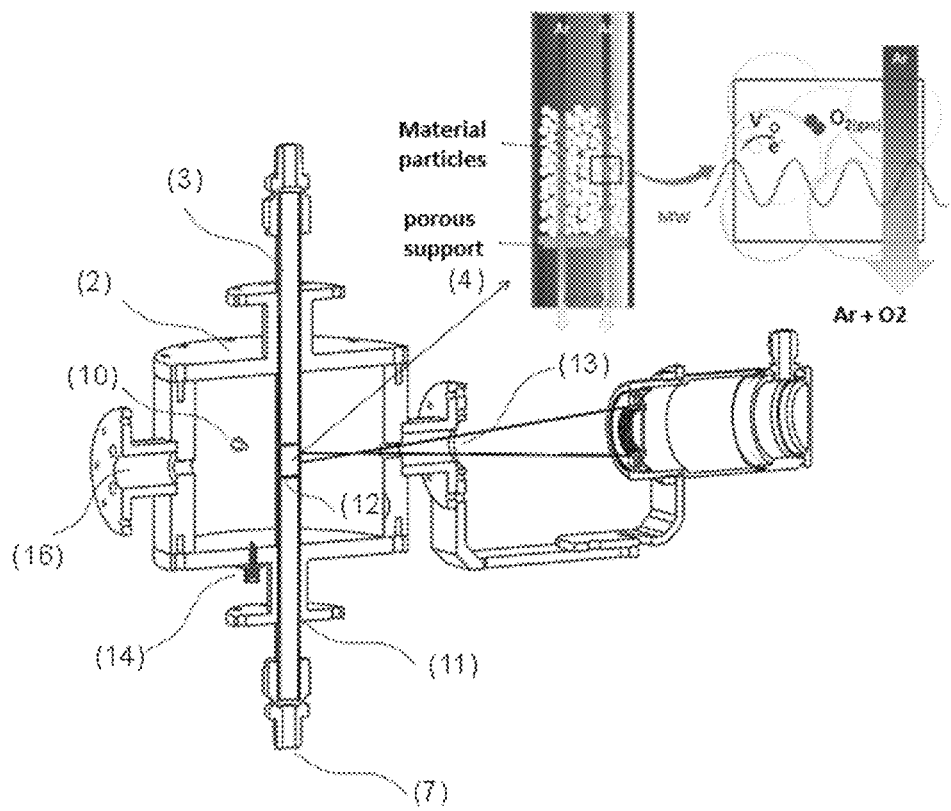

In this particular embodiment, the shot temperature can be identified from the measurement of the conductivity of the material to be reduced and this temperature identification test can also be carried out in the same cavity of FIG. 5 and simultaneously with the radiation microwave, with the added advantage of eliminating the need for physical contact with the sample.

In this particular embodiment, for the conductivity measurement of the material to be reduced in the applicator cavity of FIG. 1, an electrical coupling (14) has been added to the bottom wall of the applicator cavity using an SMA connector (internal diameter ~1.5 mm) and a second low-power microwave source and microwave receiver have been installed around the 2.1 GHz frequency, to feed a second resonant mode TM010 that can coexist with the main mode of microwave radiation in the TE111 cavity without interference.

An additional filter can be placed in the receiver measurement stack to provide a high level of isolation greater than 100 dB to ensure the safety of all simultaneous operations.

Automatic operation of these measurements is also done by connecting the analyzer to a computer with a GP-IB link.

In this particular embodiment, the electrical conductivity is calculated using the MCPT technique (Microwave Cavity Perturbation), where the depolarization of the electric field in the sample is taken into account.

The container (3) allows the extraction or evacuation of the released element (oxidized substance generally in the form of a gas or liquid), for example, by applying a vacuum, the use of an entrainment fluid, the use of a reactive fluid that consume or use a selective separator of the released element, or combinations thereof. If said element is not evacuated from the container in which the material is inside the cavity, when the microwave radiation ceases, it generally reacts again with the solid and re-oxidizes it, to return it to its original state (as regards to its energetic, morphological, crystalline or compositional state).

In a particular case (referred to the one explained above, where it describes FIG. 13A), the material may not be fixed in the container and enter and exit as a fluid, as is done industrially in catalytic reactor processes of moving bed catalytic reactors or mobile adsorption columns. adsorption mobiles. In such a case, the oxidized element released after the application of microwave radiation is evacuated mixed with the reduced material and there would be a subsequent separator, for example, a cyclonic separator type or a porous filter type, depending on the specific state of the reduced material. In this particular case, the evacuation and separation of the reduced material would necessarily be carried out at high speed to limit the re-oxidation of the reduced material in contact with the released element in the absence of microwave radiation.

This reduction process is technically simpler than the techniques known so far, as only microwave radiation and fluid control (composition and fluid-dynamics) are required, generally using vacuum or a carrier gas. Otherwise, the reduction requires very high temperatures (>1000° C., depending on the material) and the use of reducing chemical agents such as $H_2$, CO or solid carbon, with very high process complexity, safety risks and high production costs.

The re-oxidation process of the material with a molecule such as: $O_2$, $H_2O$, $Cl_2$, $F_2$, HF, HCl, $H_2S$, $N_2O$, $NO_x$ o $CO_2$, containing an atom capable of being reduced and incorporated into the structure of the material does not require a minimum temperature, but re-oxidation will be complete and fast above the "shot temperature".

Depending on the application, it is necessary to use one material or another, to adjust the kinetics of the process, the stability of the material to "microwave cycling", the reduction capacity, the selectivity to one oxidizing molecule or another and the catalytic activity for the reactions. (typically between a solid and a fluid, or at the interface between fluids). In the choice, it is also necessary to consider the energy requirements in both the reduction and oxidation cycles, so as to control (generally one wants to minimize) the release or consumption of heat in both processes.

In another particular embodiment (FIG. 3A), the gas formed (oxidized fluid) is evacuated mixed with the material to be reduced and there is a subsequent separator outside the applicator cavity, which separates the reduced solid material from the oxidized gas stream, for example, cyclone separator type or porous filter type. The material to be reduced (4) could flow continuously, as liquid or solid particles in a moving fluid, through the container, as occurs, for example, in industrial systems such as FCC ("fluid catalytic cracking"), "Chemical looping" systems or fluidized bed reactors with entrainment. (FIG. 3A) FIG. 4 shows a process in which the complete cycle of microwave radiation-induced reduction and purely chemical oxidation of the material takes place in separate units, so that it is the material that circulates throughout the redox chemical cycle.

Alternatively, a selective separator can be integrated inside the cavity that separates, from the rest of the circulating fluid, the oxidized element released through the reduction of the material by the application of microwaves (FIG. 3B).

The present invention further relates to a reduced material obtained by the process defined above.

The present invention further relates to the use of the process defined above, or of the material reduced by the process of the invention, in industrial, agricultural or medicinal processes.

According to a particular use, the reduced material is used as a selective absorbent to treat a gaseous stream.

According to a further particular use, the industrial process is the selective removal of a gas, such as, for example, $O_2$, $O_3$, $Cl_2$, $F_2$, $Cl_2$, $Br_2$, HCl, HBr, HF, $H_2S$ or mixtures thereof, from a gaseous stream. It is carried out using the material in a reduced state, which is capable of reacting with impurities (for example, $O_2$, $O_3$, $Cl_2$, $F_2$, $Cl_2$, $Br_2$, HCl, HBr, HF, $H_2S$, $N_2O$, $NO_x$ or mixtures thereof) and fixing them in its crystalline structure. This "absorbent" material is instantly regenerated by microwave radiation.

The industrial process can be the generation of a chemical product through the reaction of the material in a reduced state and a second organic molecule—oxidized molecule—capable of being reduced, to form products with new functional groups. The oxidized molecule can be $CO_2$ and the product obtained from the reaction of the oxidized molecule and the reduced material CO. The oxidized molecule can also be selected from $H_2O$ and $H_2S$ and the product obtained from the reaction of the oxidized molecule and the reduced material is $H_2$. The oxidized molecule can be a mixture of gases containing $H_2O$ and $CO_2$ that reacts with the material in a reduced state, to directly form hydrocarbon products (such as alenes, olefins, aromatics, alcohols or other oxygenated hydrocarbons).

An additional particular use of the process is the generation of an oxidant molecule, using the product resulting from the oxidation of the anion, for example, to produce $O_2$, $Cl_2$, $F_2$, $Br_2$, S, etc. The generation of said molecules induced by microwave radiation can be carried out in a chemical reactor for the oxidation of hydrocarbons or other molecules (Chemical looping type) in which an oxidant molecule is generated in situ (for example, $O_2$ or $Br_2$), in such a way that its generation in another installation or unit is avoided and, at the same time, the concentration of said oxidant molecule in the reactor can be controlled and, at the same time avoiding exceeding explosive or flammable limits, while achieving high selectivity in the reaction oxidation target.

A further particular use of the process is the generation of a chemical product through the reaction of the material in a reduced state and a molecule chosen from among alcanes, alkenes, naphthenes and aromatic hydrocarbons, to form products with new functionalities. Thus the functionalization or activation of hydrocarbons, such as methane or ethane to give olefins, hydrogen, synthesis gas or aromatic hydrocarbons is achieved.

The term "activation" refers to breaking a C—H bond in a saturated hydrocarbon, such that a function can be included into that C—, and as a result the molecule is more active (or reactive) and possesses new functional groups.

Hydrocarbons are functionalized, for example, by some type of oxidation, where the reaction products are usually olefins, alkynes, aromatic and oxygenated compounds (alcohols, ketones/aldehydes, acids, etc.).

According to an additional particular use, the industrial process is the activation (ON-OFF) of a material, for example, for sensors, such as magnetic elements, elements in electronics, etc. such that when its reduction state changes, its catalytic properties can be adjusted for a given reaction. In this case the material is reduced or oxidized depending on whether it is ON or OFF. A particular example of this use is the activation of $ZrO_2$, $Nb_2O_5$, etc. whose activation at low temperatures without chemical reducing agents is not possible. Through this industrial process, it is possible to induce electronic conductivity in materials or components, in a way that allows its use in sensors, gas separation membranes (mixed ionic electronic conducting membranes), security systems, telecommunications, etc.

According to a further particular use, the material reduced by the effect of microwave radiation, obtained by the process of the invention, is used for storing energy in the reduced material.

According to an additional particular use, the reduced material is used for the fast recharging of batteries thanks to the selective reduction of material comprised in the negative electrode and the simultaneous evacuation of the oxidation product. That is, the storage of energy in the reduced material: batteries to recharge instantly by microwave or chemical storage for future use in chemical reactors. One embodiment refers to so-called Metal-Air batteries, in which the anode is recharged by means of microwave reduction, the $O_2$ generated being evacuated from the anode chamber, and during the use of the battery (discharge), the anode gradually discharges through ion diffusion, for example, oxygen ions through a selective electrode (for example, doped $CeO_2$ o $ZrO_2$) and producing electrons at the anode, with a higher potential, which will circulate through the battery external circuit (the charge). Another alternative for the application in Metal-Air batteries is the use of electrolytes based on proton conductors in combination with the reduction of $H_2O$ in situ.

According to a further particular use, the industrial process comprises obtaining a product selected from extraterrestrial $O_2$, $H_2$, $O_2$—in remote locations or in space missions using extraterrestrial minerals —.

The present invention further relates to a method of using the process defined above, or a method of using the material reduced by the method of the invention, in industrial, agricultural or medicinal processes.

According to a particular embodiment, said method comprises contacting the reduced material with a gaseous stream and carrying out a selective absorption of one or more components of the gaseous stream.

According to a further particular embodiment, said method comprises contacting the reduced material with a gaseous stream and carrying out a selective elimination of a gas, such as, for example, $O_2$, $O_3$, $Cl_2$, $F_2$, $Cl_2$, $Br_2$, $HCl$, $HBr$, $HF$, $N_2O$, $NO$, $H_2S$ or mixtures of them, from the gas stream. It is carried out using the material in a reduced state, which is capable of reacting with impurities (for example, $O_2$, $O_3$, $Cl_2$, $F_2$, $Cl_2$, $Br_2$, $HCl$, $HBr$, $HF$, $H_2S$ or mixtures of them) and fixing them in its crystalline structure. This "absorbent" material is instantly regenerated by microwave radiation.

According to a further particular embodiment, said method comprises carrying out a reaction of the material in a reduced state and a second organic molecule—oxidized molecule—capable of being reduced, and generating a chemical product with new functional groups. The oxidized molecule can be $CO_2$, or it can be $H_2O$ and $H_2S$, or it can be a gas mixture containing $H_2O$ and $CO_2$ and the corresponding products will be those indicated above.

According to a further particular embodiment, said method comprises using the product resulting from the oxidation of the anion, and generating an oxidant molecule, which can be, for example, $O_2$, $Cl_2$, $F_2$, $Br_2$, $S$, etc.

According to a further particular embodiment, said method comprises carrying out a reaction of the material in a reduced state with a molecule chosen from among alkanes, alkenes, naphthenes and aromatic hydrocarbons, to form products with new functionalities.

According to a further particular embodiment, said method comprises carrying out the activation (ON-OFF) of a material, for example, for sensors, such as magnetic elements, electronic elements, etc. such that when their reduction state changes, their catalytic properties they can be adjusted for a given reaction.

Throughout the description and claims the word "comprise" and its variants are not intended to exclude other technical characteristics, additives, components or steps. For those skilled in the art, other objects, advantages and characteristics of the invention will emerge in part from the description and in part from the practice of the invention.

BRIEF DESCRIPTION OF THE FIGURES AND REFERENCES USED IN THE FIGURES (1) Microwave radiation source
(2) Microwave applicator
(3) Container in which the material to be reduced is deposited
(4) Sample of material to be reduced
(5) temperature sensor
(6) Microwave radiation
(7) Devices for extraction or separation of fluids, evacuator of fluids (for example, gases)
(8) Analysis means
(9) Power isolator
(10) Coupling to introduce power microwaves
(11) Cut hole to insert container of material to be reduced
(12) Support for the material to be reduced
(13) Hole for measuring the surface temperature of the material to be reduced
(14) Coupling (optional) for in-situ conductivity measurement
(16) Hole (optional) for observation of the process.
(17) Water cooling system.

FIG. 1: Scheme of the configuration of the equipment to reduce a material by treatment with microwave radiation.

Figure 2:
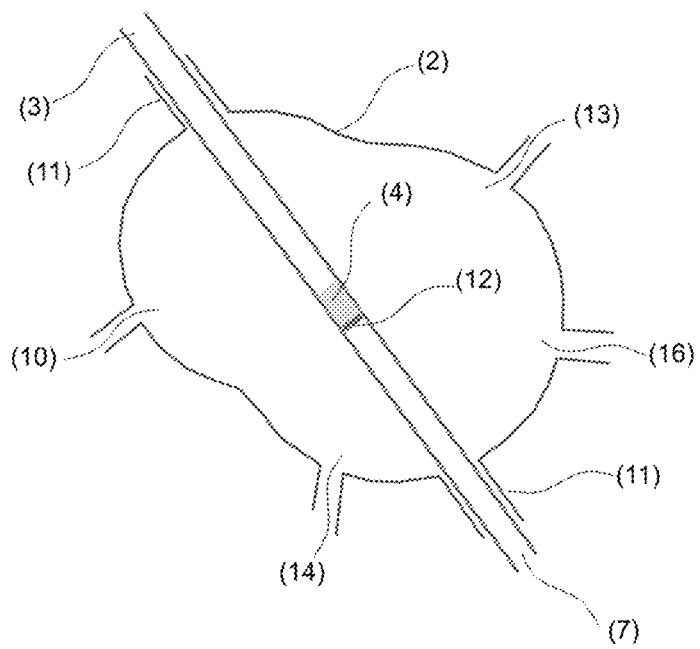

FIG. 2: Scheme of the applicator cavity and additional components to reduce a material with microwaves.

Figure 3:
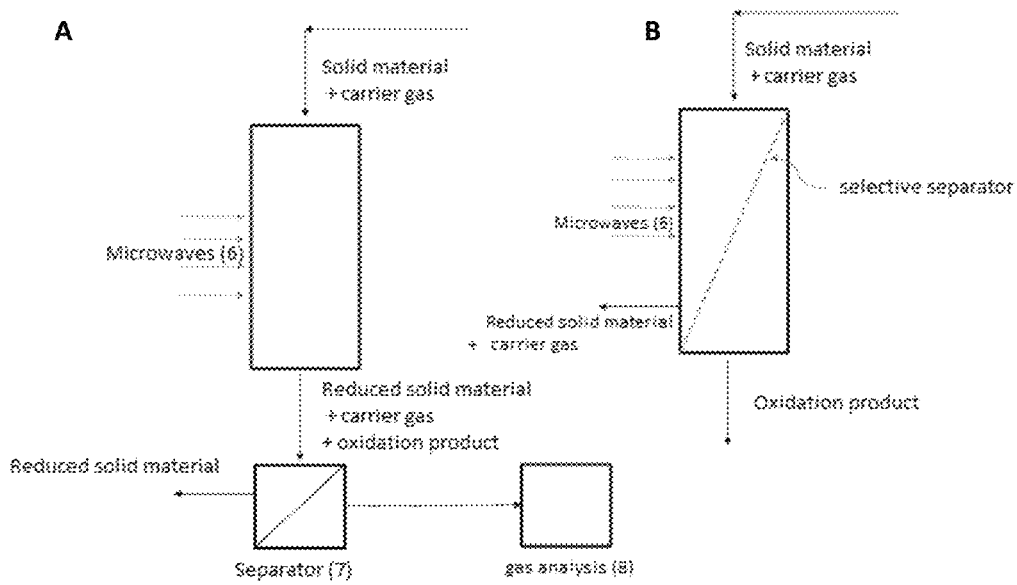
Figure 4:
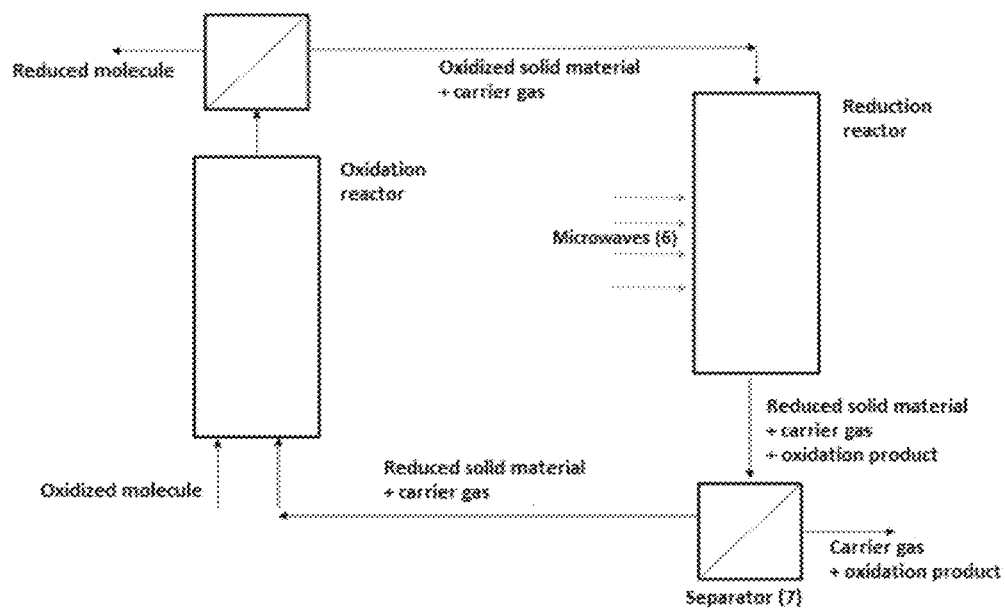

FIG. 3: Scheme of an embodiment in which the material (4) to be reduced is continuously fed: A) Scheme of the applicator cavity (2) plus components followed by a separator (7) of the gas produced in the reduction, with respect to the reduced material and B) scheme of the applicator cavity (2) plus components included within the cavity itself (2) a selective separator of the gas produced in the reduction.

FIG. 4. Scheme of an embodiment in which the material (4) to be reduced is continuously fed, and a process takes place in which it performs the complete cycle of reduction induced by microwave radiation (6) and pure chemical oxidation of the material (4) that takes place in different units, such that it is the material (4) the one that circulates throughout the redox chemical cycle.

FIG. 5: Particular implementation of the reduction process in a microwave applicator (2) configured as a cylindrical cavity FIG. 6: Arrhenius diagram of electrical conductivity for the CGO material with, and without, microwave application.

Figure 7:
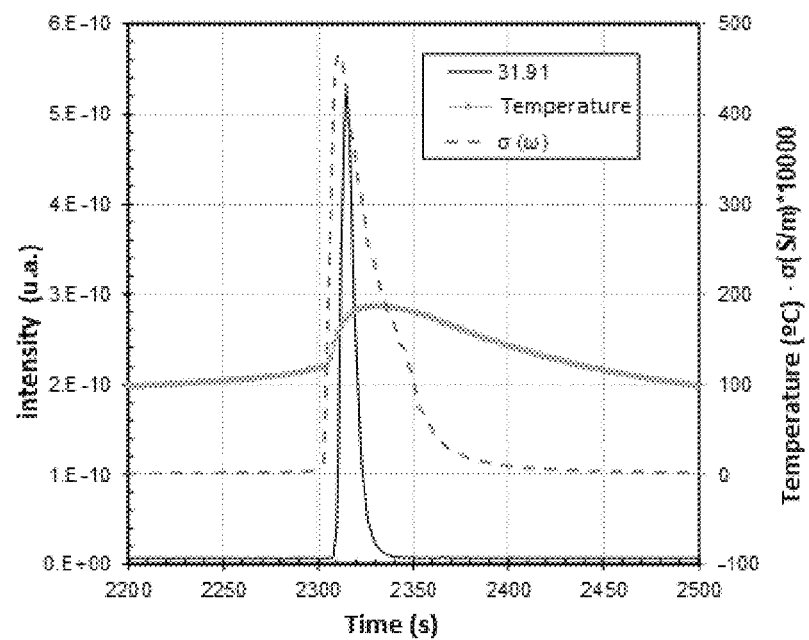

FIG. 7: Temporal evolution of the electrical conductivity, temperature and ion current (m=32) during the application of microwaves to the CGO material.

Figure 8:
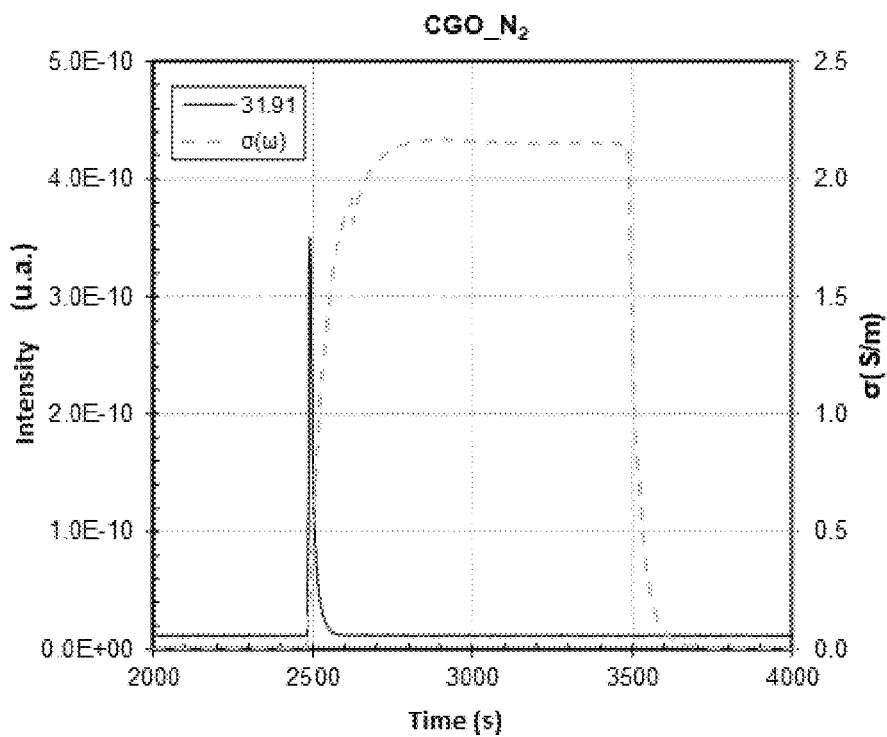

FIG. 8: Temporal evolution of the electrical conductivity and ion current (m=32) during the application of microwaves to the CGO material under a nitrogen gas current.

Figure 9:
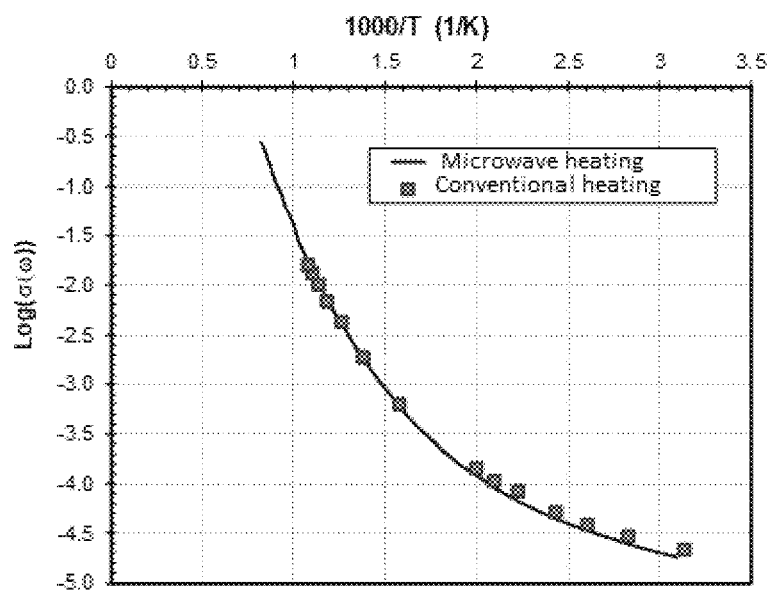

FIG. 9: Arrhenius diagram of electrical conductivity for porcelain material with, and without, microwave application.

Figure 10:
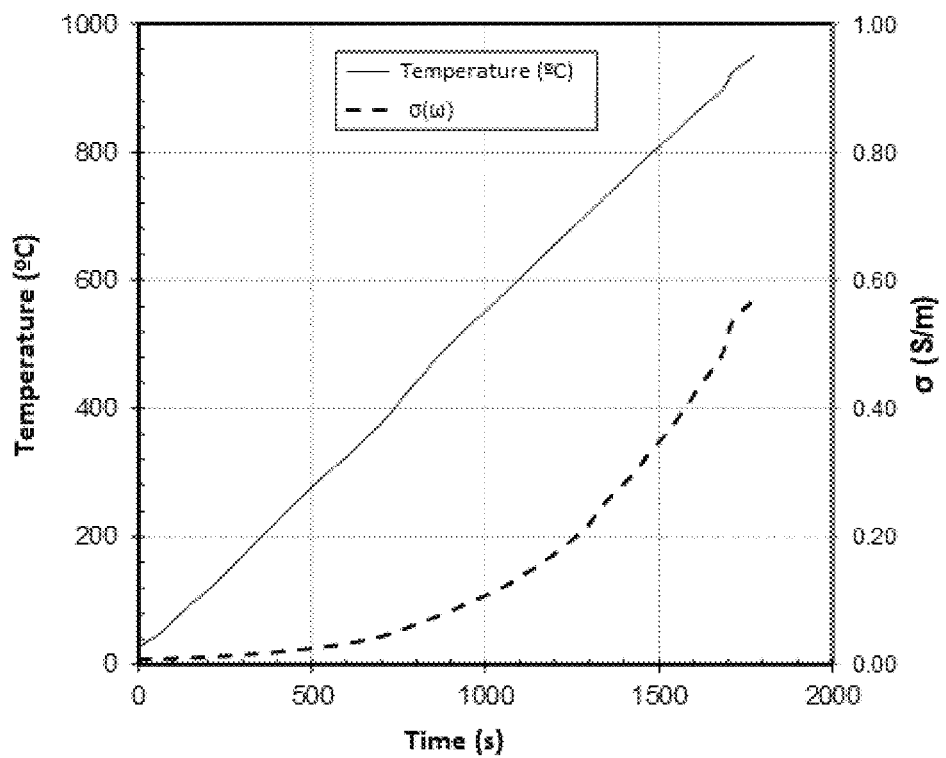

FIG. 10: Temporal evolution of the electrical conductivity and temperature during the application of microwaves to the porcelain material.

Figure 11:
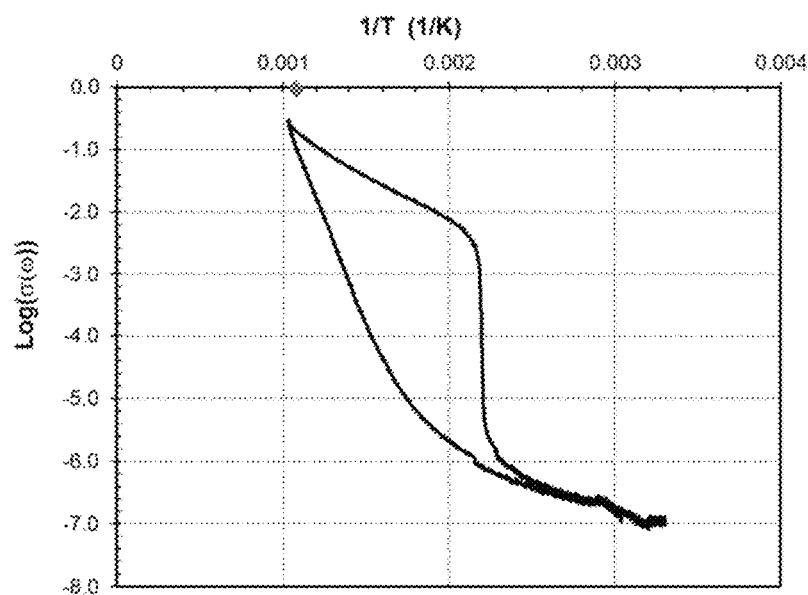

FIG. 11: Arrhenius diagram of electrical conductivity for the 8YSZ material, with and without, microwave application.

Figure 12:
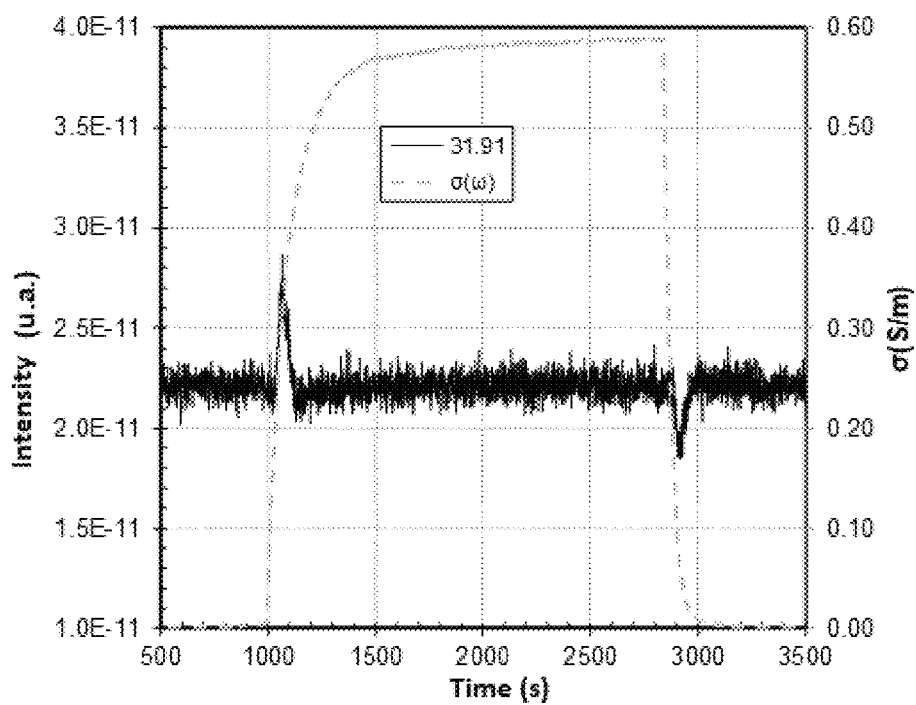

FIG. 12: Temporal evolution of the electrical conductivity and ion current (m=32) during the application of a microwave radiation step to the 8YSZ material.

Figure 13:
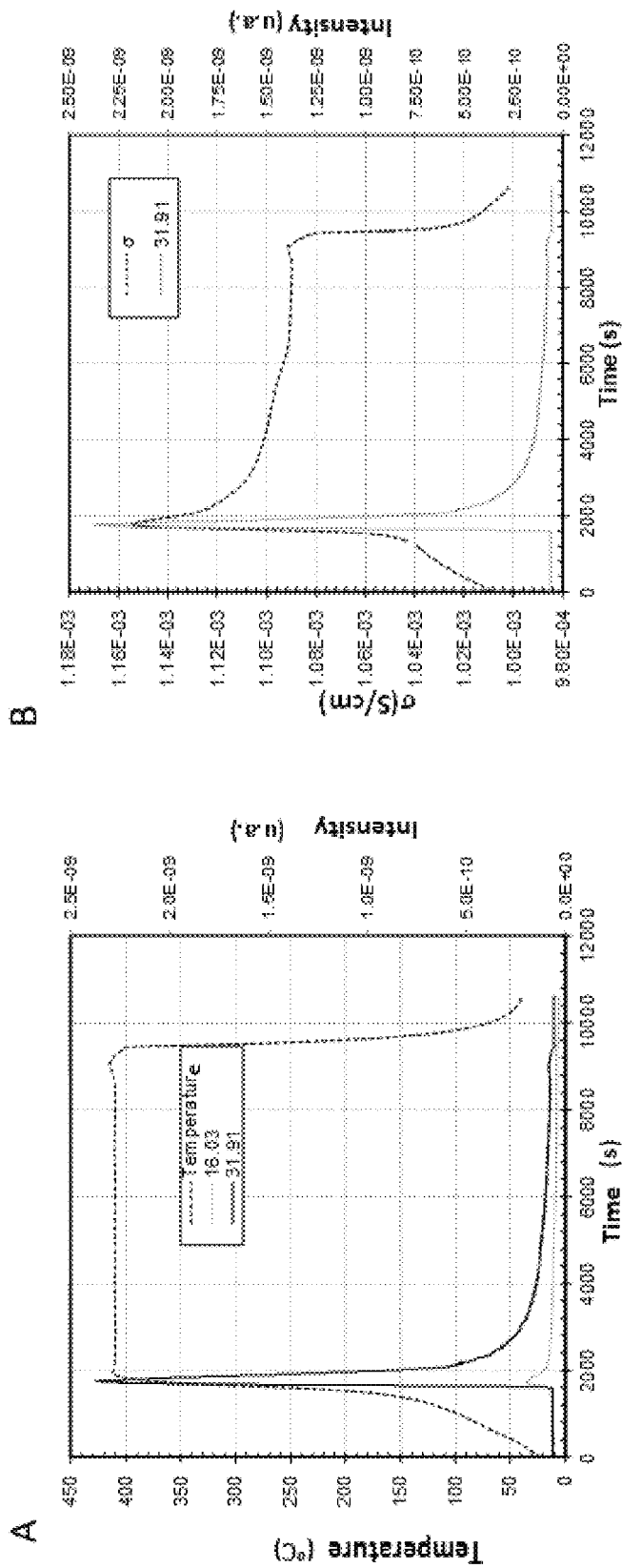

FIG. 13: A) Temporal evolution of the temperature and ion current (m=31.91 and M=16.03) associated with $O_2$, and B) temporal evolution of the electrical conductivity and ion current (m=31.91) associated with $O_2$. In both cases, during the same microwave application on the $CaTi_{0.8}Fe_{0.2}O_{3-\delta}$; material with a perovskite-type crystalline structure under constant flow of dry $N_2$.

Figure 14:
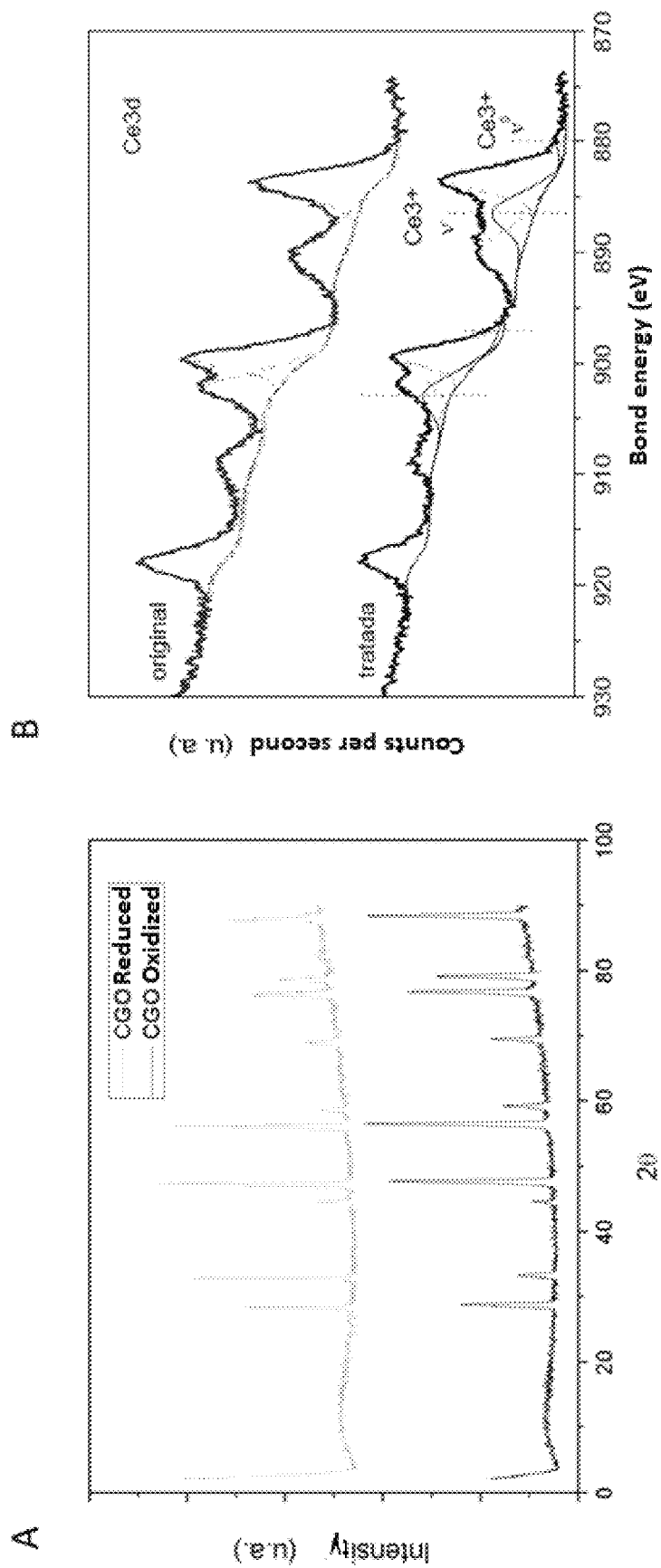
Figure 15:
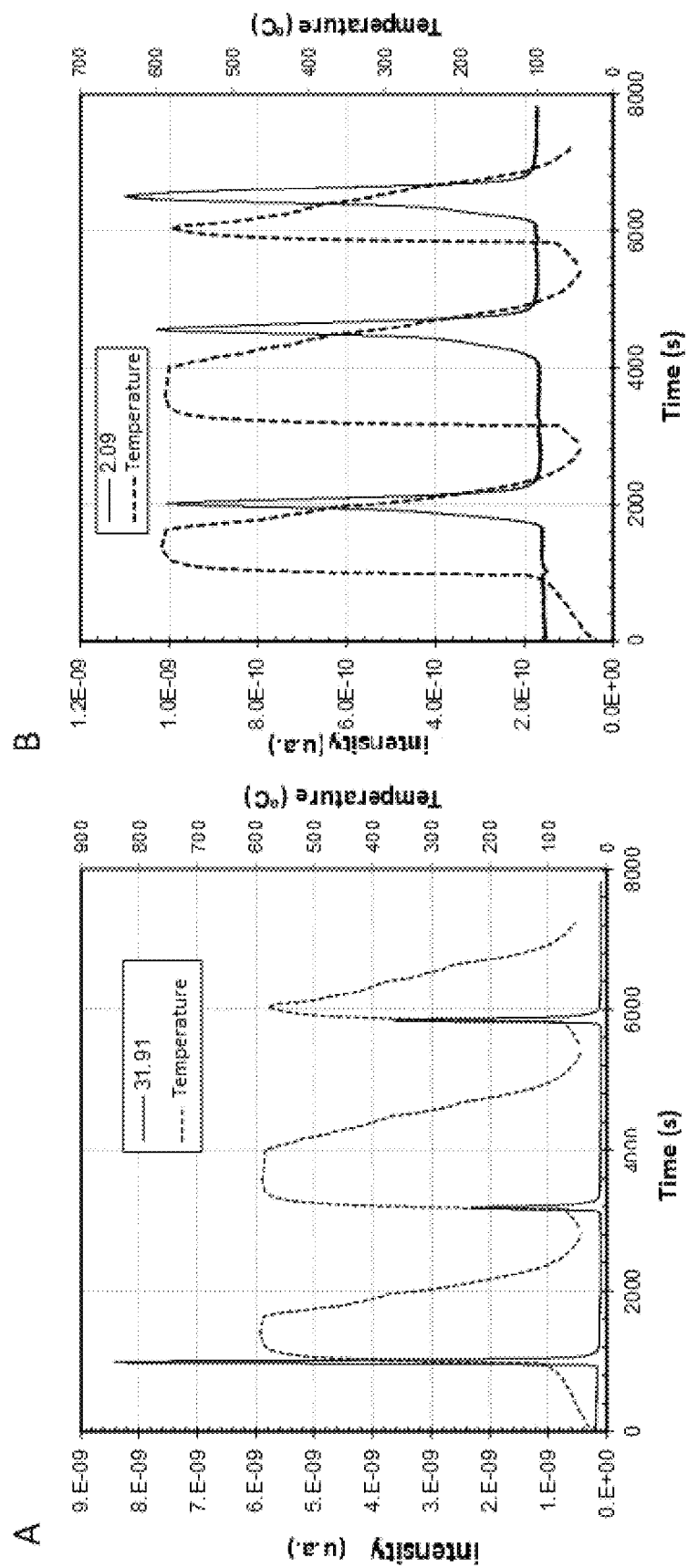

FIG. 14: A) X-ray diffraction diagrams for the CGO material before and after its reduction by the application of microwaves; B) XPS spectrum for the CGO material before and after its reduction by the application of microwaves FIG. 15: A) Temporal evolution of the temperature and ion current (m=32) associated with $O_2$, and B) temporal evolution of the temperature and ion current (m=2.09) associated with $H_2$. In both cases during the same microwave application in three steps in a row to the CGO material under a wet Ar flow.

Figure 16:
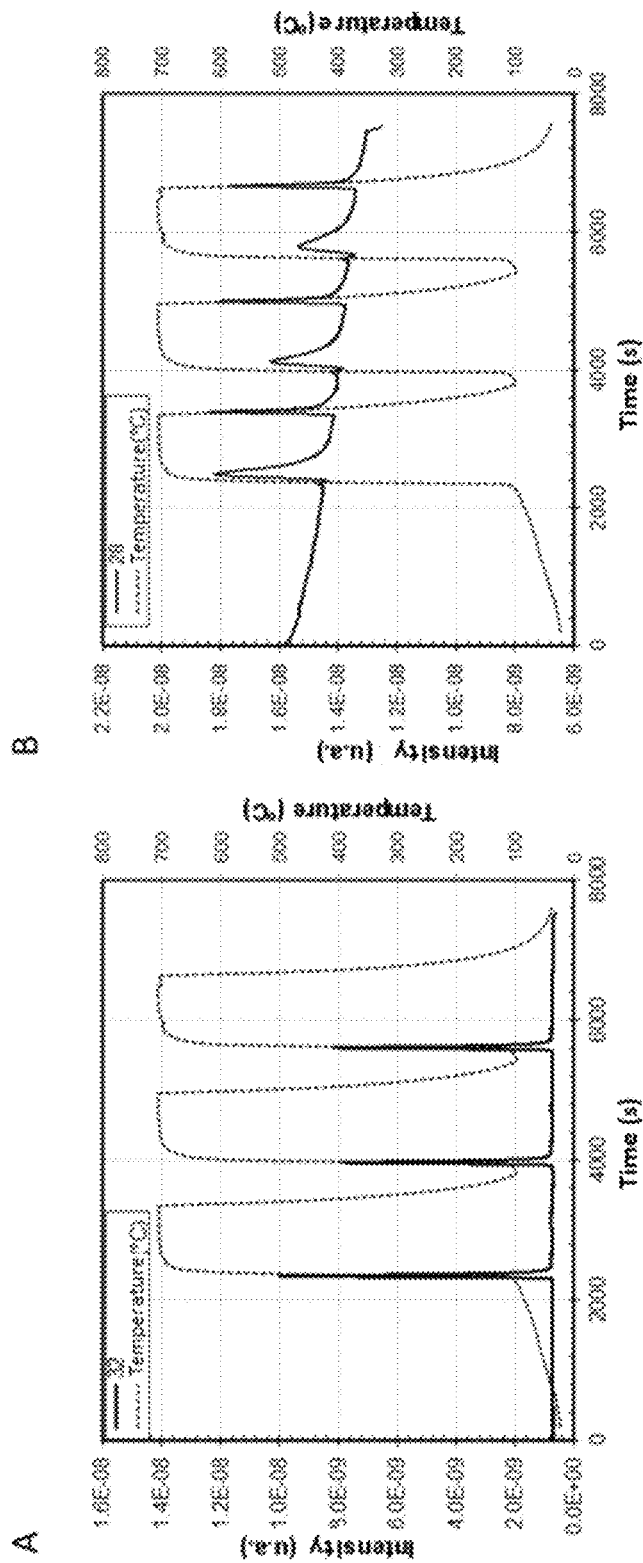

FIG. 16: A) Temporal evolution of the temperature and ion current (m=32) associated with $O_2$, and B) temporal evolution of the temperature and ion current (m=28) associated with CO. In both cases during the same microwave application in three consecutive steps to the CGO material under a flow of $CO_2$ diluted in dry Ar and free of $N_2$.

Figure 17:
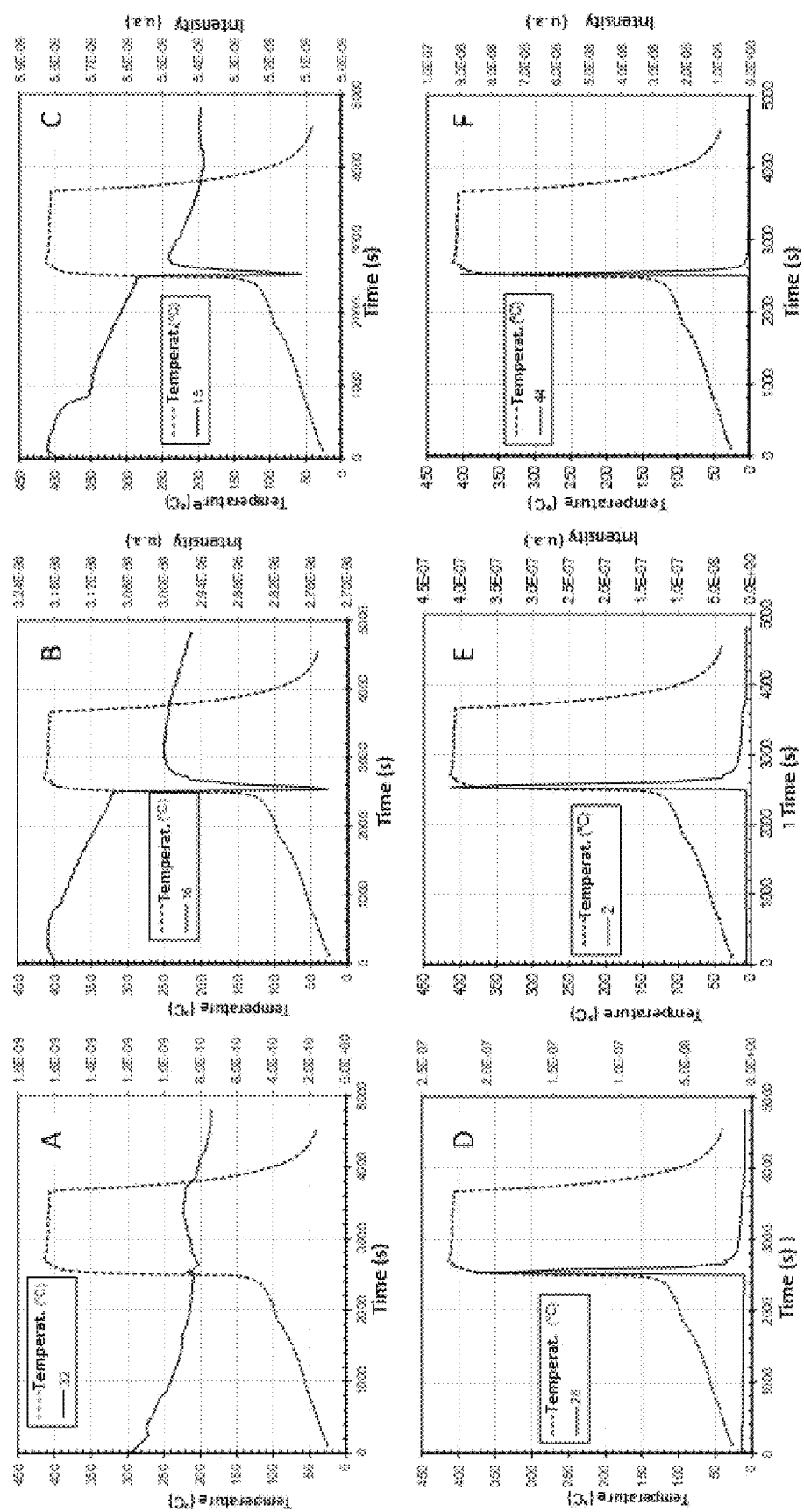

FIG. 17: Temporal evolution of temperature and ion current during the same microwave application, with a temporal profile in the form of a step, to the CGO material under a flow of undiluted, dry and $N_2$-free $CH_4$ gas.

FIG. 17A: Temporal evolution of the temperature and ion current (m=32) associated with $O_2$.

FIG. 17B: Temporal evolution of the temperature and ion current (m=16) associated with $CH_4$.

FIG. 17C: Temporal evolution of the temperature and ion current (m=15) associated with $CH_4$.

FIG. 17D: Temporal evolution of the temperature and ion current (m=28) associated with $CO_2$.

FIG. 17E: Temporal evolution of the temperature and ion current (m=2) associated with $H_2$.

FIG. 17F: Temporal evolution of the temperature and ion current (m=44) associated with $CO_2$.

Figure 18:
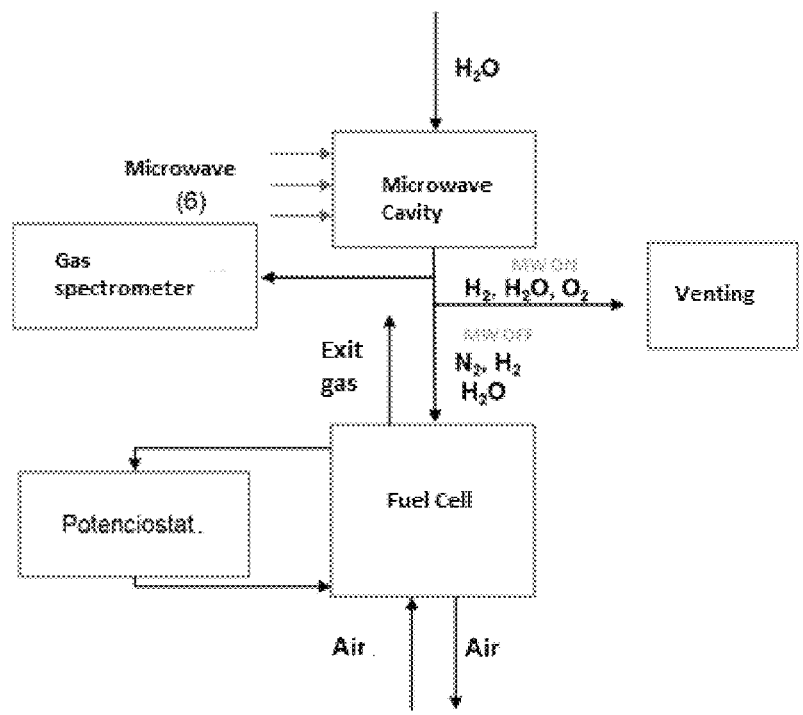

FIG. 18: Scheme of the configuration of a system for the production of energy through the use of hydrogen generated in the microwave cavity and of a fuel cell. The diagram includes the equipment for the measurement and control of the $O_2$ and $H_2$ generated (mass spectrometer), as well as the voltage generated in the fuel cell (potentiostat).

Figure 19:
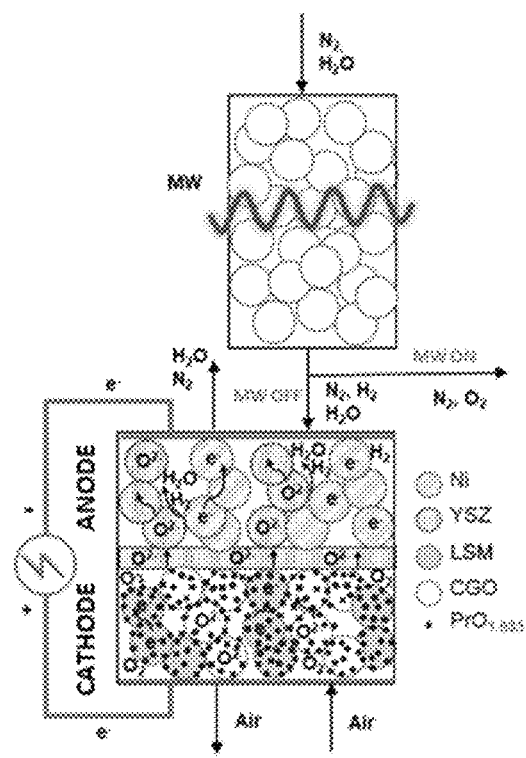

FIG. 19: Figure in detail of the ceramic materials used in the fuel cell and microwave cavity for the production of energy through the reduction of COG by microwave radiation (FIG. 18), as well as the composition of the current of the used gases.

Figure 20:
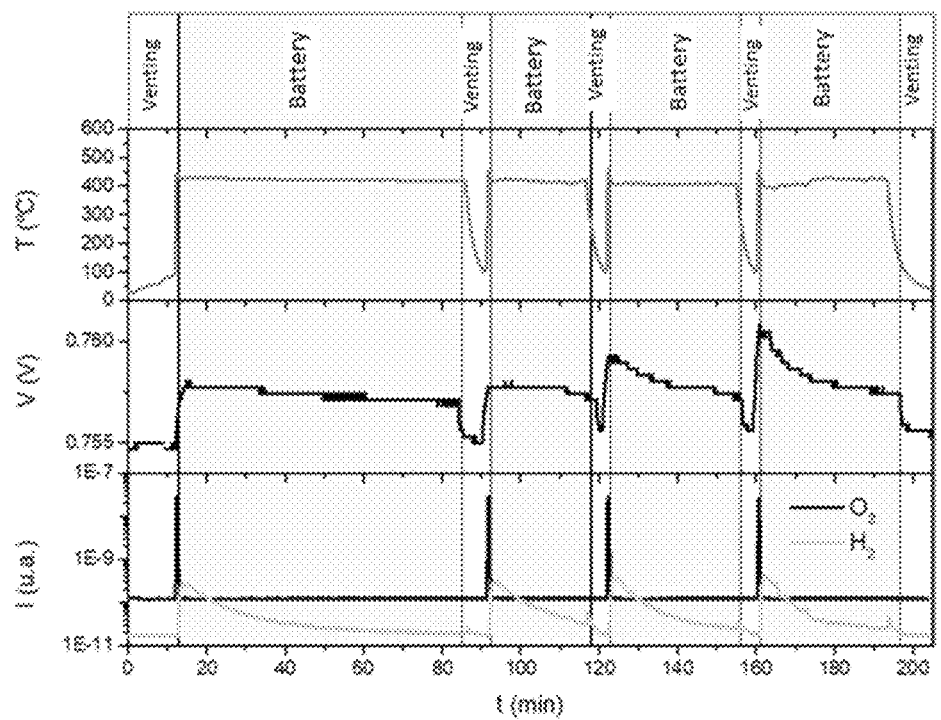

FIG. 20: Temporal evolution of the temperature of the reduction material, of the ion current at the exit of the cavity (m=2, associated with $H_2$ and m=32, associated with $O_2$) and the potential of the fuel cell during the different $H_2$ and energy production cycles. In all cycles, the CGO material is under a gas flow of 30 ml/min of saturated $N_2$ in water at room temperature. The fuel cell is connected to a potentiostat and the open circuit potential is measured.

Figure 21:
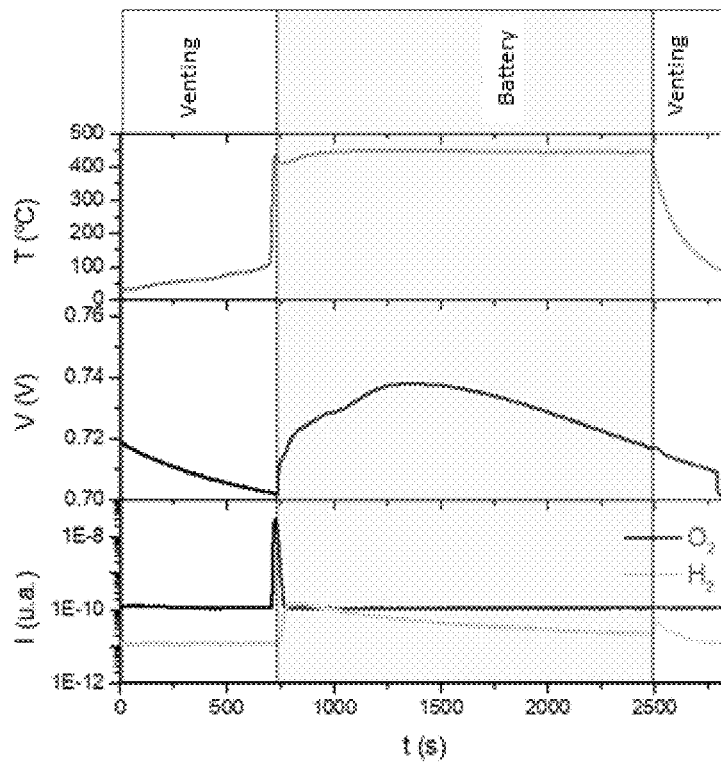

FIG. 21: Temporal evolution of the temperature of the reduction material, of the ion current at the exit of the cavity (m=2, associated with $H_2$ and m=32, associated with $O_2$) and of the potential of the fuel cell for the production of $H_2$ and energy. At all times the CGO material is under a gas flow of 30 ml/min of saturated $N_2$ in water at room temperature. The fuel cell is connected to a potential measurement equipment in galvanostat mode with a current density demand of 7.85 $mA/cm^2$.

Figure 22A:
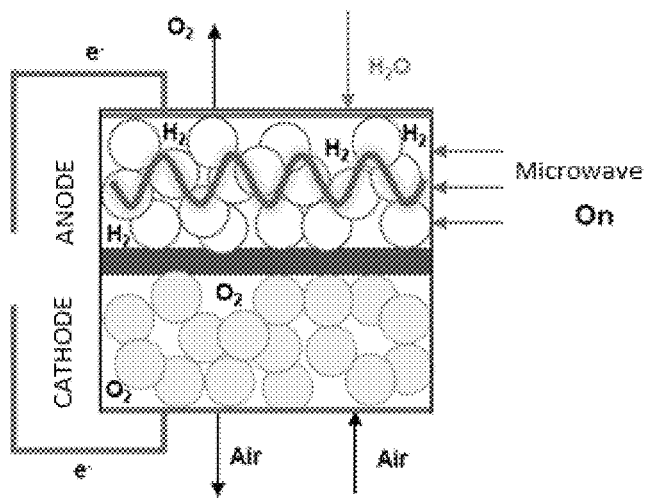
Figure 22B:
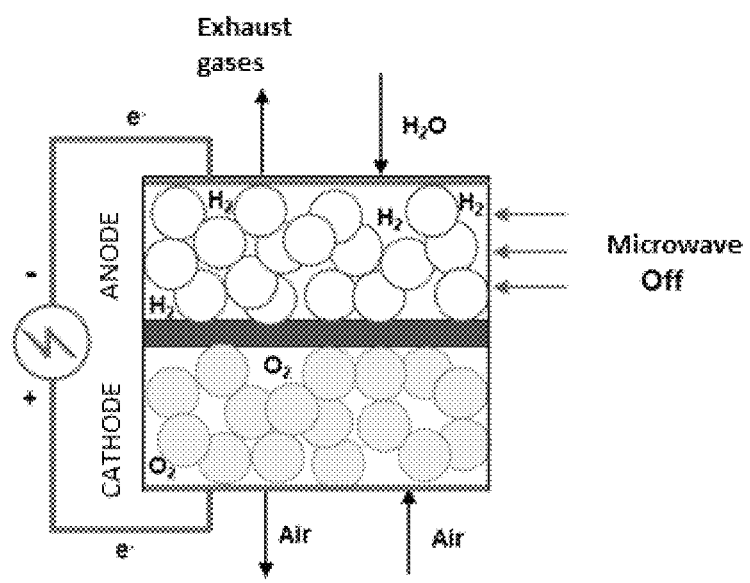

FIGS. 22a-22b: Scheme of an embodiment in which energy is produced by a battery in which microwave radiation is applied, $O_2$ is released, and when the reduced material re-oxidizes, the battery is recharged by the $H_2$ generated in the process.

FIG. 22a: Graphical representation of the battery charging from microwave radiation.

FIG. 22b: Graphical representation of the battery discharging by consumption of $H_2$ generated during charging.

The present invention is illustrated by the following examples which are not intended to be limiting thereof.

EXAMPLES

Example 1

In a process of irradiating a sample by microwave, the resonant cylindrical cavity of FIG. 5 is used. The sample consists of 3 g of cerium oxide doped with gadolinium CGO ($Ce_{0.8}Gd_{0.2}O_{1.9}$), that is placed in the form of granules on a support (12) inside the applicator cavity (2). A gaseous stream of nitrogen is applied (with a flow of 100 mL/min under normal conditions) (0° C. and 1 atm) which flows through the material and microwave radiation is applied (power around 100 W), such that the temperature increases progressively until reaching a shot temperature at which the reduction of the material is produced, accompanied by the release of gaseous $O_2$.

Figure 6:
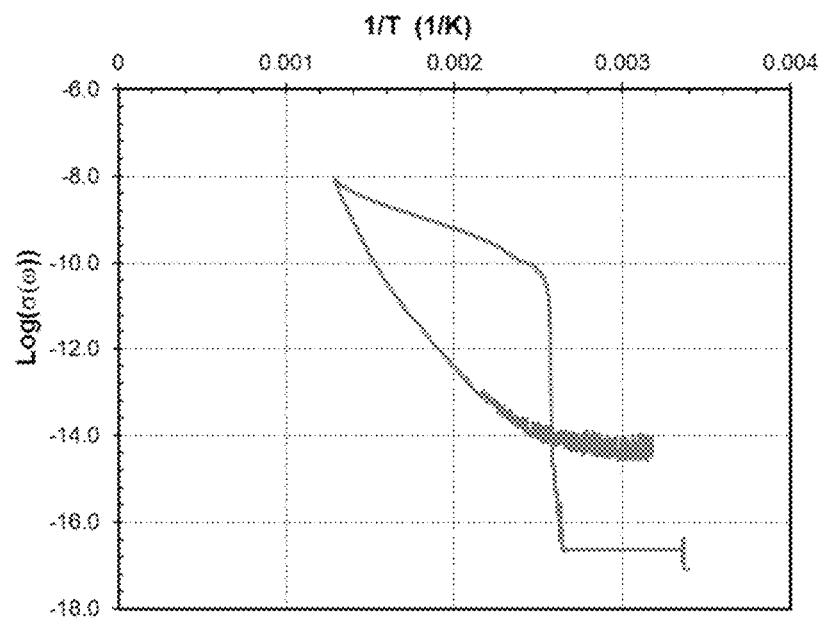

This process has been monitored through the measurement of electrical conductivity shown in FIG. 6, where a sharp jump in conductivity is observed at a shot temperature of 136° C. with an increase in conductivity of –18% in 4° C. This abrupt increase is related to an increase in the concentration of electric charge carriers (polarons) generated thanks to the partial reduction of the material by the action of microwave radiation.

Also, the figure includes the conductivity measurement when heating occurs by conventional means, electrical resistance and/or infrared radiation. This measurement shows the absence of a reduction process, that is, no sudden changes in conductivity are observed.

The exit gas from (7) is analyzed by means of a mass spectrometer (8) of the Pfeiffer Vacuum OmniStar type. FIG. 7 shows the measurement of the mass corresponding to oxygen (m=32) as a function of the experiment time. This figure also represents the temporal evolution of electrical conductivity and temperature as a function of time. It is observed that a release of oxygen takes place that starts when a sudden change in electrical conductivity is detected. This release of molecular oxygen (02) constitutes unequivocal evidence of the reduction of the material through the application of microwave radiation.

FIG. 8 shows the results of another type of operation. In this case, microwave radiation is applied and the reduction of the CGO material occurs and the irradiation is maintained in such a way that the reduced material is kept at a constant temperature.

FIG. 8 shows the temporal evolution of electrical conductivity and the measurement of the mass corresponding to oxygen (m=32) as a function of time. It is observed that, after the reduction and stabilization of the conductivity—at the level corresponding to "reduced"—it is possible to maintain this conductivity level constantly until the microwave radiation ceases.

TABLE 1

Effect of the partial pressure of oxygen and the power of the radiation applied during the reduction in the increase in the electrical conductivity of the CGO material, shot temperature and the amount of $O_2$ released after its reduction through the application of microwaves.

| Material | Gas | Power (W) | Shot Temperature (° C.) | Oxygen released (mL) | Conductivity Δ in 4° C. (%) |
|---|---|---|---|---|---|
| $Ce_{0.8}Gd_{0.2}O_2$ | N2 | 98.90 | 136 | 0.739 | 18.49 |
| | | 108.84 | 146 | 1.012 | 29.92 |
| | Ar | 89.14 | 119 | 0.622 | 45.18 |
| | 0.1% $O_2$-Ar | 85.73 | 110 | 0.701 | 41.74 |
| | Ambient air | 72.60 | 115 | 0.500 | 73.96 |
| | 0.01% $O_2$-Ar | 74.56 | 124 | 0.160 | 49.25 |
| | 1% $O_2$-Ar | 90.95 | 121 | 0.220 | 4.64 |

Table 1 shows a summary of the key parameters (shot temperature, quantity of $O_2$ gas released and sudden increase in electrical conductivity) in the reduction of the CGO material by means of microwaves when the partial pressure of gaseous $O_2$ has varied in the gaseous current that passes through the material. It is observed that when the partial pressure decreases, the reduction takes place at lower shot temperatures and more $O_2$ is released. The increase in electrical conductivity does not seem to change noticeably with the partial pressure of $O_2$.

Even in air, it is possible to detect the release of oxygen by CGO. The oxygen released increases as the $pO_2$ of the sweep gas decreases, reaching a plateau after de $pO_2 \sim 10^{-4}$ atm (0.01% $O_2$/Ar). The release of oxygen is a function of the applied MW power.

Table 1 also shows the effect on the key parameters in the reduction of the CGO material when different powers of radiation are applied. These results demonstrate that the reduction process can be controlled by adjusting this power. The greater the power of the applied microwave radiation, the greater the conductivity gap. More oxygen can be released and thus more oxygen vacancies are produced, and the effect is measured in the transport properties of the material as a higher level in the sudden increase in conductivity.

Example 2

On the other hand, there are materials that can be irradiated by microwaves, such as porcelain-type materials, which do not exhibit the behavior of CGO and which, therefore, cannot be reduced by microwave radiation according to the present invention. FIG. 9 shows the measurement of electrical conductivity for porcelain material as a function of temperatura, when microwave radiation is being applied (solid line in FIG. 9) and it can be seen that there is no sudden change in conductivity, this means, there is no reduction of the porcelain material and, therefore, there is no shot temperature for this type of material. This figure also includes the conductivity measurement when heating occurs by conventional means, electrical resistance and/or infrared radiation. Said measurements perfectly coincide with the measurements made by applying microwave radiation, this is why it is confirmed that for this material microwaves cannot induce a reduction of the material in the operating range proposed in the present invention. This behavior is observed both when the material is measured in a tube open to the atmosphere, and when a gaseous flow is applied to it, such as currents of Ar, He, He, $N_2$, $O_2$, $H_2$, Ar/$O_2$ mixtures (0.01%, 0.1%, 1.5%) and saturated $H_2O$ streams.

FIG. 10 shows the temporal evolution of the electrical conductivity and the temperature as a function of the test time when the microwave radiation is applied on the porcelain material. It is observed that the temperature increases linearly with time while the conductivity shows a typical behavior of thermal activation, but a sudden change that can be associated with the microwave reduction is not observed, as was observed for the CGO material (FIG. 7).

Example 3

FIG. 11 shows the Arrhenius plot of the measured electrical conductivity of 3 g of microwave irradiated $Y_{0.16}Zr_{0.86}O_{2-\delta}$ (8YSZ) as a function of temperature (reciprocal) when a gaseous current in Ar (with flux 100 mL/min under normal conditions) was made to pass through said material in the form of granules. As it was appreciated for the CGO (example 1), a shot temperature of approximately 200° C. could be identified, in this case, from which a strong increase in conductivity occured with the application of microwaves, followed by a slower increase. This abrupt increase in electrical conductivity is related to the reduction of the material that makes the concentration of electronic carriers to increase noticeably. This phenomenon is accompanied by the release of gaseous $O_2$ (FIG. 12) and the formation of oxygen vacancies in the crystalline structure, since the reduction process preserves the integrity of the fluorite structure of the 8YSZ material. It is to be pointed out that the reduction of the 8YSZ material, and in particular the $Zr^{+4}$ cations of its structure, is very complex and normally requires very high temperatures (>1700° C.) combined with the use of strong chemical reducing agents. Likewise, it is noted that after microwave reduction the fluorite structure is preserved, although the number of oxygen vacancies increases as a consequence of the reduction. FIG. 11 also shows the evolution of the electrical conductivity of the material when microwave radiation is not applied, observing that it presents a curve without a sudden activation jump and following the expected curve for a pure oxygen ion ($O_2$) conductor, as is the 8YSZ material FIG. 12 shows the results of a test wherein microwave radiation is applied and the 8YSZ material is reduced under dry Ar flow (with flow of 100 mL/min under normal conditions) and the irradiation is maintained in such a way that the reduced material is kept at a constant temperature. FIG. 12 shows the temporal evolution of electrical conductivity and the measurement of the mass corresponding to oxygen (m=32) as a function of time. It is observed that, after the reduction and stabilization of the conductivity—at the level corresponding to "reduced"—it is possible to maintain this conductivity level constantly until the microwave radiation ceases and, at that point, an inverse peak is observed (absorption) in the $O_2$ signal, which indicates the re-oxidation of the material, despite the fact that the $O_2$ content in the Ar used is below $2 \cdot 10^{-5}$ bar. This example shows that the present invention will allow oxygen impurities to be removed from gas streams to levels even below parts per million (ppm), i.e., it will allow to selectively purify gas streams

TABLE 2

Effect of the partial pressure of oxygen and the power of the radiation applied during the reduction, in the increase of the electrical conductivity of the 8YSZ material, shot temperature and the amount of $O_2$ released after its reduction by means of the application of microwaves.

| Material | Gas | Power (W) | Shot Temperature (° C.) | Oxygen released (mL) | conductivity Δ in 4° C. (%) |
|---|---|---|---|---|---|
| $Zr_{0.92}Y_{0.08}O_{2-x}$ | Ar | 52.61 | 192 | 0.005 | 64.57 |
| | 0.01% $O_2$-Ar | 57.59 | 180 | 0.013 | 56.56 |
| | Ambient air | 27.54 | 261 | 0.07 | 51.98 |

Table 2 shows a summary of the key parameters (shot temperature, amount of $O_2$ gas released and sudden increase in electrical conductivity) in the reduction of the 8YSZ material by microwaves when the partial pressure of $O_2$ gas in the gaseous stream (with a flow of 100 mL/min under normal conditions) that passes through the material, has been varied. It is observed that the amount of $O_2$ released increases as the partial pressure of $O_2$ decreases.

The temperatures at which the difference in conductivity between the conventional process and the microwave are maximum is 361° C. for 8YSZ (example 3) and 216° C. for CGO (example 1). The difference between the materials may be related to the reducibility of their cations, since the presence of the $Ce^{3+/4+}$ pair is easier to achieve than the $Zr^{3+/4+}$ pair for YSZ.

Example 4

Following the procedure described in Example 1, various materials based on doped cerium oxide were reduced as follows: microwave radiation was applied at a power within the range of 25-75 W within the system described in example 1 by passing Ar through the material. Various undoped and Gd-doped cerium oxide materials (10 and 20 mol. %), Pr (20 mol. %) and (Gd 10 mol. % and Nb 4%), all of them having the crystalline structure of cubic fluorite. Table 3A shows a summary of the key parameters (shot temperature, amount of $O_2$ gas released and sudden increase in electrical conductivity) in the reduction of the different materials by means of microwaves when a gaseous current is passed through the material with a flow of 100 mL/min under normal conditions. It is observed that the parameters that characterize the result of the reduction can be varied by controlling the composition of the crystal lattice of the material to be reduced. Doping allows modifying the reducibility of the material, but also its ionic conductivity, which is important since the mobility of the oxygen ion within the crystal lattice plays a role in the reduction process.

TABLE 3 A

Effect of doping of the material based on cerium oxide, in the increase of the electrical conductivity of said materials, shot temperature and the amount of $O_2$ released after its reduction through the application of microwaves.

| Material | Gas | Power (W) | Shot Temperature (° C.) | Oxygen released (mL) | Conductivity Δ in 4° C. (%) |
|---|---|---|---|---|---|
| $Ce_{0.9}Gd_{0.1}O_2$ | 1% O2-Ar | 80.63 | 130 | 0.5 | 18.63 |
| $Ce_{0.8}Gd_{0.2}O_2$ | Ambient air | 72.60 | 115 | 0.5 | 73.96 |
| $CeO_2$ nanocristaline | Argon | 28.61 | 100 | 7.3 | 91.78 |
| $Ce_{0.8}Pr_{0.2}O_{2-x}$ | Ambient air | 12.93 | 271 | 0.9 | 69.16 |
| $Ce_{0.86}Gd_{0.1}Nb_{0.04}O_2$ | Ambient air | 38.24 | 221 | 0.6 | 72.91 |

Similarly, Table 3B shows a summary of the key parameters (shot temperature, amount of $O_2$ gas released and sudden increase in electrical conductivity) in the reduction of the different materials, based on zirconium oxide ($Zr_{0.86}Y_{0.12}O_{2-x}$, $Zr_{0.94}Y_{0.06}O_{2-x}$ and $Zr_{0.86}Sc_{0.12}O_{2-x}$) by microwaves when a gaseous current is passed through the material.

TABLE 3B

Effect of doping of the material based on zirconio oxide, in the increase of the electrical conductivity of said materials, shot temperature and the amount of $O_2$ released after its reduction by means of microwave application.

| Material | Gas | Power (W) | Shot Temperature (° C.) | Oxygen released (mL) | Conductivity Δ in 4° C. (%) |
|---|---|---|---|---|---|
| $Zr_{0.92}Y_{0.08}O_{2-x}$ | Ambient air | 27.54 | 261 | 0.09 | 51.98 |
| $Zr_{0.97}Y_{0.03}O_{2-x}$ | | 45.59 | 220 | 0.05 | 69.20 |
| ScYSZ | | 34.77 | 271 | 0.11 | 61.74 |

Table 4 shows the increase in conductivity, the amount of $O_2$ released and the shot temperature during the reduction, through the application of microwaves of different materials with different composition and crystalline structure. The sample $Si_{0.4}Al_{0.3}Ti_{0.1}Fe_{0.2}O_x$ is representative of a typical rock on the moon. The process was carried out according to example 4. It is observed that it is possible to carry out the reduction in different materials. Specifically, the reduction of the following cations is observed: $Ti^{+4}$, $Gd^{+3}$, $Nb^{+5}$, $W^{+6}$, $Fe^{+3}/Fe^{+4}$, what allows adjusting properties of the reduction process by means of microwaves and, therefore, the use of this method in different applications. FIG. 13A shows the evolution of the temperature for the material $CaTi_{0.8}Fe_{0.2}O_{3-\delta}$ with a perovskite-type crystalline structure, when microwave radiation is applied under a constant flow of dry $N_2$ (with a flow of 100 mL/min under normal conditions) and the measurement of the masses corresponding to the gaseous oxygen released (m=31.91 and m=16.03) as a function of time. FIG. 13B shows the temporal evolution of the electrical conductivity and the measurement of the mass corresponding to the gaseous oxygen released (m=31.91) as a function of time.

TABLE 4

Increase in the electrical conductivity of these materials, shot temperature and the amount of $O_2$ released after its reduction through the application of microwaves of different materials.

| Material | Gas | Power (W) | Shot Temperature (° C.) | Oxygen released (mL) | Conductivity Δ in 4° C. (%) |
|---|---|---|---|---|---|
| $Nb_2O_5$ | Ambient air | 64.8 | 549 | 0.05 | 78.3 |
| $Gd_{1.98}Ca_{0.02}O_{4-\delta}$ | Ambient air | 59.8 | 339 | 0.07 | 12.7 |
| $TiO_2$ | $N_2$ | 117.6 | 320 | 0.12 | 90.0 |
| $La5.5WO12_{-\delta}$ | Ambient air | 30.0 | 361 | 0.25 | 31.8 |
| $NdBaLnO4$ | Ambient air | 115.7 | 226 | 0.3 | 33.3 |
| $CaTi_{0.8}Fe_{0.2}O_{3-\delta}$ | $N_2$ | 22.3 | 207 | 1.9 | 42.5 |
| $Si_{0.4}Al_{0.2}Mg_{0.1}Ca_{0.05}$-$Ti_{0.1}Fe_{0.15}O_{1.7-\delta}$ | $N_2$ | 68.3 | 325 | 0.13 | 23.2 |

Example 6

FIG. 14 describes the physicochemical characterization of materials reduced by microwave radiation. FIG. 13A shows in the X-ray diffraction diagrams for the CGO sample (Example 1) without reduction and after reduction by microwave. A shift of the diffraction peaks to the right is observed for the microwave-treated sample, confirming that the material has been reduced. This increase in the size of the crystal lattice is characteristic of the partial reduction of the $Ce^{+4}$ to $Ce^{+3}$ cation.

FIG. 14B shows the XPS (X-ray photoelectron spectroscopy) diagrams that allow characterizing the oxidation state of different chemical elements in the most superficial atomic layers of the materials. In this case, as in FIG. 14A, measurements are shown for the original untreated and microwave-treated CGO sample. In general terms, the reduction of the $Ce^{+4}$ to $Ce^{+3}$ cation is observed, while in this case the reduction of the $Gd^{+3}$ cation is not appreciated for this material, given the greater reducibility of the $Ce^{+4}$ cation.

Example 7

This example describes how hydrogen can be generated by reacting reduced CGO material (by microwave radiation) with water vapor.

The process was carried out in a set-up as described in example 1 and passing a stream of Ar (with flow of 100 ml/min under normal conditions) wet (3% vol). The process consisted of three cycles and each one is described as follows: (i) microwave radiation is applied in such a way that the temperature rises until the shot temperature is reached and the CGO material is reduced, releasing $O_2$ gaseous which is entrained by the current of wet Ar, (ii) the microwave radiation is kept on and the temperature is maintained for a few minutes, then (iii) the microwave radiation is stopped and the CGO material is oxidized by the extraction of the oxygen atom from the water (steam) of the gas stream, what gives rise to the production of $H_2$ gas, and (iv) finally, the material is allowed to cool down to room temperature. FIG. 15A shows the temporal evolution of the temperature and the measured signal corresponding to the mass of oxygen (m=32) as a function of the experiment time. The release of $O_2$ in each cycle is observed, when the temperature rises under microwave radiation, such that the material is reduced and, subsequently, it is maintained for a few minutes at the maximum temperature reached until the microwave radiation ceases and then it is cooled to room temperature. FIG. 15B shows the temporal evolution of the temperature and the measurement of the mass corresponding to $H_2$ (m=2) as a function of time. In each cycle, the release of $H_2$ is observed when the microwave radiation ceases and the temperature drops, such that the water vapor in the gas stream is reduced to form $H_2$ and the CGO material is re-oxidized. This figure therefore demonstrates a reproducible and cyclic method for $H_2$ production according to the present invention.

Example 8

This example describes how $CO_2$ can be reduced to form CO by reacting the reduced CGO material (by microwave radiation) with $CO_2$ from a gaseous stream. The process was carried out in a setup as described in example 1 and passing a dry gas stream (with a flow of 100 ml/min under normal conditions) composed of $CO_2$ (25% vol.) diluted in Ar and totally free of $N_2$. Analogously to the process described in Example 7, the process consisted of three cycles and each one is described as follows: (i) microwave radiation is applied in such a way that the temperature rises until the shot temperature is reached and the CGO material is reduced, releasing gaseous $O_2$ that is carried along by the gaseous current, (ii) the microwave radiation is kept on and the temperature is maintained for a few minutes, then (iii) the microwave radiation is stopped and the material CGO is oxidized by the extraction of an oxygen atom from $CO_2$ from the gas stream, what results in the production of $CO_2$ gas, and (iv) finally, the material is allowed to cool down to room temperature. FIG. 16A shows the temporal evolution of the temperature and the measured signal corresponding to the mass of $O_2$ (m=32) as a function of the time of the experiment. In each cycle, the release of $O_2$ is observed when the temperature rises under microwave radiation, such that the material is reduced and, subsequently, it is maintained for a few minutes at the maximum temperature reached until the microwave radiation ceases, and the cooling down to room temperature is produced. FIG. 16B shows the temporal evolution of the temperature and the mass measurement (m=28) directly related to the presence of CO. In each cycle, the release of CO is observed in two steps (a) when the reduction of the CGO material has taken place (all the gaseous $O_2$ has been evacuated) and the temperature begins to stabilize, what means that the control system of microwave reduces the power of the applied radiation and increases its ability to re-oxidize, and (b) when microwave radiation completely ceases and the temperature drops. In both stages, the $CO_2$ in the gas stream is reduced to form CO while the CGO material is re-oxidized. This figure therefore demonstrates a reproducible and cyclable method for $CO_2$ reduction and CO production according to the present invention.

Example 9

This example describes how the partial oxidation of $CH_4$ can occur through the release of oxygen species from the crystalline lattice of the CGO material as it is reduced by the effect of microwave radiation. This example shows how—as the material is reduced-, the oxidation product (oxygen in this case) is consumed in situ thanks to the use of a reactive fluid ($CH_4$) that consumes it. The process was carried out in a set-up as described in example 1 and passing a dry gas stream (with a flow of 100 mL/min under normal conditions) composed of $CH_4$ (10% vol.) diluted in Ar and totally free of moisture and $N_2$.

The process consisted of applying microwave radiation in such a way that the temperature rises until the shot temperature is reached and the CGO material is reduced, releasing oxygen species that reacts on the surface of the CGO material and gives rise to partial oxidation products (mainly CO, $H_2$, $CO_2$), which are entrained by the gaseous stream and measured by a mass spectrometer. Subsequently, the material is allowed to cool down to room temperature.

FIG. 17A shows the temporal evolution of the temperature and the measured signal corresponding to the mass of $O_2$ (m=32) as a function of the time of the experiment. The release of $O_2$ is barely detectable when the temperature rises under microwave radiation, so that although the material is reduced at the shot temperature, the oxygen is consumed through the partial oxidation reactions of methane in the gas stream. FIGS. 17B-C show the evolution of the masses m=16 and m=15 corresponding to the $CH_4$, and show that from the shot temperature a significant amount of the $CH_4$ gas is consumed to produce other gaseous products.

FIGS. 17D-EF show the temporal evolution of temperature and the measurement of the mass (m=28) directly related to the presence of CO, the mass (m=2) directly related to the formation of $H_2$ and the mass (m=44) directly related to the presence of $CO_2$. It is observed that when the CGO material is reduced by the action of microwaves, part of the $CH_4$ is converted into CO, $H_2$ and $CO_2$ among other partial oxidation products. This figure, therefore, demonstrates a reproducible method for the oxidation and functionalization of a refractory molecule such as $CH_4$.

Example 10

In this example—illustrated by FIG. 18—the operation of a battery powered with the $H_2$ produced using microwave energy is shown. In a first step, a mass of 0.963 g of COG is placed in the microwave cavity, and it is reduced by microwave radiation (power around 100 W) in the presence of water vapor, 30 ml/min of $N_2$ with 2.5% vol. of $H_2O$. The $O_2$ generated, as well as the $N_2$ and $H_2O$ present in the gas leaving the cavity, are released in this step by means of a vent. In a second step, the power of the microwave radiation is reduced (around 30 W) and the material is re-oxidized with the 2 5% volumetric water present in the $N_2$ fed to the cavity.

This second step leads to the production of H$_2$. At this point, the battery is charged, the discharge is carried out by consuming the generated H$_2$. The H$_2$ produced is fed to the anode of a fuel cell, while air is introduced into the cathode. For the electrochemical characterization of the fuel cell, a potentiostat is used. Likewise, the generation of gases in the microwave cavity is controlled by means of a mass spectrometer, which allows continuous monitoring of the signal associated with each of the gases under study (m=2, associated with H$_2$ and m=32, associated with O$_2$).

Example 11

In this example—illustrated by FIG. 19—the components of the electrochemical cell used in the proof of concept, as well as in the microwave cavity, are sown in detail. The fuel cell consists of a 15 mm diameter cell, supported on the anode. The anode is composed of a composite of nickel metal (after reduction with H$_2$) and yttrium stabilized with zirconium. The zirconium stabilized yttrium electrolyte has a thickness of ≈7 μm. The cathode is composed of a 50% by volume mixture of La$_{0.85}$Sr$_{0.15}$MnO$_3$ and Ce$_{0.8}$Gd$_{0.2}$O$_2$, and infiltrated with a 2M solution (ethanol-water) of Pr(NO$_3$)$_3$.6H$_2$O. The cathode is calcined in air at 750 C for 2 hours, for the elimination of nitrates and the formation of nanoparticles (<40 nm) of praseodymium oxide (PrO$_{1.833}$). For the microwave cavity, a bed of 0.963 g of Ce$_{0.8}$Gd$_{0.2}$O$_2$ is used, and it is fed with a stream of 30 ml/min of N$_2$ saturated with water at room temperature (2.5%. Vol.). When the microwave radiation is turned on and the shot temperature is reached (around 100 W), O$_2$ is released, and this is sent to a vent. Ce$_{0.8}$Gd$_{0.2}$O$_2$ is heated up to temperatures close to 450° C. Subsequently, the power applied (around 30 W) to the Ce$_{0.8}$Gd$_{0.2}$O$_2$ is reduced, allowing a constant temperature (close to 400° C.) and a controlled production of hydrogen. This H$_2$ is fed into the fuel cell, on the anode side. A constant flow of synthetic air with a flow rate of 50 ml/min is introduced on the cathode side. The electrochemical cell works at a constant temperature of 700° C. The O$_2$ present in the cathode is reduced to oxygen ions (O$^{2-}$), and these ions pass through the electrolytic material, due to its ionic conduction. Once the ions reach the anode, they react with the H$_2$ present, generating H$_2$O and a flow of electrons. This flow of electrons circulates through an external circuit and is controlled with a potentiostat. The mass spectrometer was used to qualitatively control the production of H$_2$ and O$_2$.

Example 12

In this example—illustrated by FIG. 20, the experimental results obtained in the operation of a fuel cell fed with hydrogen produced by means of microwave radiation are shown, and described in FIGS. 18 and 19. For this test, different cycles were carried out continuously. Each cycle can be divided into two steps. In a first step, the CGO is fed with 30 ml/min of N$_2$ saturated with H$_2$O at room temperature, and microwave radiated. After exceeding the shot temperature (around 100 W), O$_2$ is generated. This cavity outlet stream is vented. In a second step, the applied microwave power is reduced (around 30 W) and the COG temperature is kept close to 400° C. The CGO is re-oxidized with H$_2$O, generating a continuous flow of H$_2$ that is fed to the anode of the fuel cell. In the meantime 50 ml/min of synthetic air is introduced into the cathode of the fuel cell.

Due to the incorporation of H$_2$ (generated in step two) in the electrochemical cell, there is an increase in the open circuit potential, as can be seen in FIG. 20. After consumption of H$_2$, the anode of the electrochemical cell is fed with a current of He of 50 ml/min, again reducing the open circuit potential of the cell. The open circuit potential is measured with the help of a potentiostat. The production of H$_2$ (m=2) and O$_2$ (m=32) is continuously monitored by means of a mass spectrometer. In the first step, microwave radiation, a substantial increase in the O$_2$-related signal is observed (m=32). Once the power is reduced, it is verified by means of the mass spectrometer, how the signal of mass 2 (H$_2$) increases, and this current is fed into the anode of the fuel cell. Once H$_2$ is no longer produced, the cell is re-fed with He. Likewise, this example shows the temperature of the microwave-radiated material (COG) and the open circuit potential of the electrochemical cell as a function of time.

Example 13

In this example—illustrated by FIG. 21—the results of the same cell of the previous example (FIGS. 18, 19 and 20) are shown, working in galvanostatic mode. The fuel cell operates continuously with a current demand of 7.85 mA/cm$^2$. In a first step, the fuel cell is fed with a flow of 50 l/min of H$_2$, and a reduction in power is observed. Once the O$_2$ has been released after the reduction of 0.963 g of CGO with a stream of 30 ml/min of N$_2$ saturated in H$_2$O at room temperature, the electrochemical cell is fed with the H$_2$ generated in the re-oxidation. The potential of the cell increases, generating an average power of 5.6 mW/cm$^2$ during the 35 minutes of operation with the H$_2$ generated in the microwave cavity. After disconnecting the outlet current from the microwave cavity, and reintroducing 50 ml/min of H$_2$, the potential of the cell decreases again. In this example the temperature in the microwave cavity, as well as the signal measured by a mass spectrometer, for the H$_2$ (m=2) and O$_2$ (m=32) of the gas stream leaving it, are shown.

This signal allows the continuous production of all the gases generated in the microwave cavity to be followed.

Example 14

In this example—illustrated by FIG. 22a/22b—the operation of a battery is described, wherein the two parts described above (fuel cell and microwave cavity) are integrated. The same material acts as an anode and as a material for the production of H$_2$ by microwave radiation. The device is radiated with microwaves and there is an instantaneous release of O$_2$ (FIG. 22a), after this moment, the microwaves are turned off, and H$_2$ is generated in the same chamber. The battery is discharged through the energy demand from the battery and the consumption of the generated H$_2$ (FIG. 22b). Once the H$_2$ has been consumed, the battery is recharged by means of a new microwave radiation. In a second case, two twin devices are used, while one of them produces the reduction of the material and its subsequent oxidation with the generation of H$_2$, the other ones supplies the energy demanded by the system to which it is connected. In a third case, the material radiated with microwaves and the one that works as an electrode, are separated, but integrated in the same device. After eliminating the O$_2$ produced by microwave radiation, steam is introduced into the chamber, and after re-oxidation of the material, the electrode is fed with the produced H$_2$.

The invention claimed is:

1. A process for the direct chemical reduction of a material, comprising the following steps:
applying microwave radiation to a material placed in a microwave applicator cavity, heating to at least exceeding a shot temperature in the material, and separating fluid oxidation products generated from the reduced material, such that the process is carried out without using reducing chemical agents, wherein:

the material is an inorganic material, application of microwave radiation produces a temperature increase between 50-200° C. over the shot temperature, and the shot temperature is a temperature at which electrical conductivity of the material is increased at least 4% within a 4° C. temperature increase with respect to the electrical conductivity of the material without reduction.

2. The process according to claim 1, wherein the process is carried out without use of electrical contacts.

3. The process according to claim 1 wherein the steps are carried out in a container that has the ability to evacuate fluids.

4. The process according to claim 1 wherein the step of applying microwave radiation produces a temperature increase between 50-100° C.

5. The process according to claim 1, wherein the material that is reduced is in one of a solid state, a melted state, a suspension in a liquid, or a solution in a liquid.

6. The process according to claim 5, wherein the liquid is water or a hydrocarbon able to be in a liquid state at the conditions at which the process takes place.

7. The process according to claim 1, wherein the separation of the fluid oxidation products generated from the reduced material is carried out by means of one of:

the application of vacuum, the use of an entrainment fluid, use of a reactive fluid that consumes the reduced material, use of a selective separator of the generated oxidation product, or a combination thereof.

8. The process according to claim 1, further comprising a step of in-situ measurement of the conductivity of the material to be reduced by applying microwave radiation from a second source and an associated receiver without mutual inference.

9. The process according to claim 1, wherein the material is a solid material, the composition of which comprises cerium oxide doped with gadolinium (CGO).

10. The process according to claim 1, that further comprises the following steps:

placing the material in a container capable of evacuating fluids and inert to microwave radiation, inserting the container through an orifice located in a wall of the applicator cavity in an area of uniform and an electric field as intense as possible for uniform and efficient heating, identifying the "shot temperature" for that material, carrying out, while the microwave radiation is applied, a continuous adjustment of the power applied for the radiation, and separating the fluid oxidation products generated from the reduced material, wherein the process is carried out without the use of reducing chemical agents.

11. The process of claim 1 further comprising the steps of:

contacting the reduced material with a gaseous stream, and selectively absorbing one or more components of the gaseous stream.

12. The process of claim 1 further comprising the steps of:

contacting the reduced material with a gaseous stream, and selectively removing at least one of $O_2$, $F_2$, $Cl_2$, $Br_2$, HCl, HBr, HF, $H_2S$ or mixtures thereof from the gaseous stream.

13. The process of claim 1 further comprising the step of:

carrying out a reaction of the material in a reduced state and a second organic molecule which can be reduced.

14. The process of claim 1 further comprising:

generating a chemical product through the reaction of the material in a reduced state and a molecule selected from alkanes, alkenes, naphthenes and aromatic hydrocarbons.

15. The process of claim 1 further comprising the step of recharging batteries with the reduced material.

* * * * *